United States Patent
Kato

(10) Patent No.: US 10,073,542 B2
(45) Date of Patent: Sep. 11, 2018

(54) INFORMATION PROCESSING APPARATUS AND TRANSMISSION SYSTEM FOR REDUCING SCREEN FAILURE WHEN DISPLAY DATA IS TRANSMITTED TO A DESTINATION

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 133 days.

(21) Appl. No.: 15/159,096

(22) Filed: May 19, 2016

(65) Prior Publication Data

US 2016/0259434 A1    Sep. 8, 2016

Related U.S. Application Data

(63) Continuation of application No. PCT/JP2014/083914, filed on Dec. 22, 2014.

(30) Foreign Application Priority Data

Dec. 25, 2013    (JP) ................. 2013-267983

(51) Int. Cl.
*G06F 3/0354*    (2013.01)
*G06F 13/00*    (2006.01)
(Continued)

(52) U.S. Cl.
CPC ........ *G06F 3/03543* (2013.01); *G06F 3/1415* (2013.01); *G06F 3/1438* (2013.01);
(Continued)

(58) Field of Classification Search
None
See application file for complete search history.

(56) References Cited

U.S. PATENT DOCUMENTS 9,001,179 B2    4/2015    Tanaka et al.
2003/0206193 A1    11/2003    Sato et al.
(Continued)

FOREIGN PATENT DOCUMENTS

EP    0 955 625 A1    11/1999
GB    2 286 699 A    8/1995
(Continued)

OTHER PUBLICATIONS

Extended European Search Report dated Nov. 9, 2016 in European Patent Application No. 14874140.8.
(Continued)

*Primary Examiner* — Chad Dicke
(74) *Attorney, Agent, or Firm* — Oblon, McClelland, Maier & Neustadt, L.L.P.

(57) ABSTRACT

An information processing apparatus 10*aa* capable of communicating with another apparatus via a network 2 is provided. The information processing apparatus 10*aa* includes a display unit 14*b* configured to display an image on a display apparatus included in or connected to the information processing apparatus; a transmission unit 11 configured to transmit image data of the image displayed on the display apparatus to the other apparatus; and a reducing unit 18 configured to reduce a process load involved in displaying the image on the display apparatus in the case where the transmission unit transmits the image data to the other apparatus.

12 Claims, 29 Drawing Sheets

(51) Int. Cl.
    *H04M 3/56* (2006.01)
    *G06F 3/14* (2006.01)
    *G06T 1/20* (2006.01)
    *H04N 7/14* (2006.01)
    *H04N 7/15* (2006.01)
    *G09G 5/14* (2006.01)

(52) U.S. Cl.
    CPC ............ *G06F 3/1454* (2013.01); *G06F 13/00* (2013.01); *G06T 1/20* (2013.01); *H04M 3/56* (2013.01); *H04N 7/147* (2013.01); *H04N 7/15* (2013.01); *G09G 5/14* (2013.01); *G09G 2310/04* (2013.01); *G09G 2350/00* (2013.01); *G09G 2370/025* (2013.01); *H04N 7/152* (2013.01)

(56) References Cited

U.S. PATENT DOCUMENTS

| | | | |
|---|---|---|---|
| 2005/0091610 A1 | 4/2005 | Frei et al. | |
| 2010/0011285 A1 | 1/2010 | Kawata et al. | |
| 2010/0277508 A1 | 11/2010 | Takahashi | |
| 2012/0019433 A1* | 1/2012 | Inagaki | G06F 3/1454 345/1.1 |
| 2012/0098733 A1 | 4/2012 | Masuda et al. | |
| 2013/0135179 A1 | 5/2013 | Ko | |
| 2013/0222409 A1* | 8/2013 | Akaiwa | G03B 21/14 345/589 |
| 2014/0313283 A1 | 10/2014 | Kato | |
| 2015/0296176 A1 | 10/2015 | Kato | |

FOREIGN PATENT DOCUMENTS

| | | |
|---|---|---|
| JP | 2004-005582 | 1/2004 |
| JP | 2006-146629 | 6/2006 |
| JP | 2011-254442 | 12/2011 |
| JP | 2012-028950 | 2/2012 |
| JP | 2012-108872 | 6/2012 |
| JP | 2013-130823 | 7/2013 |
| JP | 2014-209299 | 11/2014 |

OTHER PUBLICATIONS

International Search Report dated Feb. 3, 2015 in PCT/JP2014/083914 filed on Dec. 22, 2014(with English Translation).

Kazunori Hashimoto, "Windows Vista Saishu Kanzen Koryaku Manual—Eikyu Hozonban", 1$^{st}$ edition, Gijutu Hyoron Co., Ltd., Jul. 25, 2009, pp. 217 to 218.

Written Opinion dated Feb. 3, 2015 in PCT/JP2014/083914, filed Dec. 22, 2014.

* cited by examiner

LOW RESOLUTION

MEDIUM RESOLUTION

HIGH RESOLUTION

FIG.6

301t CHANGE QUALITY MANAGEMENT TABLE

| IP ADDRESS OF RELAY DESTINATION TERMINAL | IMAGE QUALITY OF RELAYED IMAGE DATA (QUALITY OF IMAGE) |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.7

501t RELAY APPARATUS MANAGEMENT TABLE

| RELAY APPARATUS ID | OPERATIONAL STATE | RECEIVE DATE AND TIME | IP ADDRESS OF RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.8

502t TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.9

503t TERMINAL MANAGEMENT TABLE

| TERMINAL ID | OPERATIONAL STATE | RECEIVE DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.10

504t DESTINATION LIST MANAGEMENT TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.11

505t SESSION MANAGEMENT TABLE

| SELECTION SESSION ID | RELAY APPARATUS ID | REQUEST SOURCE TERMINAL ID | DESTINATION TERMINAL ID | DELAY TIME (ms) | RECEIVE DATE AND TIME WHEN DELAY INFORMATION IS RECEIVED |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.12

507t QUALITY MANAGEMENT TABLE

| DELAY TIME (ms) | IMAGE QUALITY OF IMAGE DATA (QUALITY OF IMAGE) |
|---|---|
| 0~100 | HIGH IMAGE QUALITY |
| 100~300 | MEDIUM IMAGE QUALITY |
| 300~500 | LOW IMAGE QUALITY |
| 500~ | (INTERRUPTION) |

INFORMATION PROCESSING APPARATUS AND TRANSMISSION SYSTEM FOR REDUCING SCREEN FAILURE WHEN DISPLAY DATA IS TRANSMITTED TO A DESTINATION

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2014/083914 filed on Dec. 22, 2014, which is based upon and claims the benefit of priority of the prior Japanese Patent Application No. 2013-267983 filed on Dec. 25, 2013 with the Japanese Patent Office, the entire contents of which are hereby incorporated by reference.

BACKGROUND OF THE INVENTION

1. Field of the Invention

The present invention relates to an information processing apparatus, or the like, capable of communicating with another apparatus via a network.

2. Description of the Related Art

A transmission system for performing a video conference or the like with a remote place via a communication network such as the Internet has become popular. A transmission terminal transmits image data taken by a camera and audio data collected by a mike to a destination transmission terminal. Each terminal displays an image on a display device and outputs sound from a speaker.

Further, when a video conference is held by using a transmission terminal, a user participating in the conference can share, with another user of the conference, display data of a conference document, etc., displayed on a display device of an external input apparatus such as a personal computer (PC) which is used separately from the transmission terminal (refer to, for example, Patent Document 1).

In the transmission system, there is a case where a PC is used as a conference terminal operated by a user instead of a case where a dedicated transmission terminal is used as a conference terminal. For example, when a video conference program is installed in a PC, the PC can perform communications or execute processes for a video conference with another PC or dedicated terminal. Therefore, even when a user does not have a dedicated terminal, the user can participate in a video conference by having a video conference program installed in the user's PC or a PC at a visiting place.

However, because an operating system (OS) and other applications may be running on the PC, the load of the PC may be increased. As a result, there is a problem of flickering screen of the PC when the video conference program is running on the PC and the PC transmits audio data, video data, and display data to a destination terminal.

The present invention has been made in view of the above problem. It is an object of the present invention to provide an information processing apparatus in which screen failure is reduced which occurs when display data is transmitted to a destination.

CITATION LIST

Patent Document

[Patent Document 1] Japanese Laid-Open Patent Application No. 2011-254442

SUMMARY OF THE INVENTION

An information processing apparatus capable of communicating with another apparatus via a network is provided. The information processing apparatus includes a display unit configured to display an image on a display apparatus included in or connected to the information processing apparatus; a transmission unit configured to transmit image data of the image displayed on the display apparatus to the other apparatus; and a reducing unit configured to reduce a process load involved in displaying the image on the display apparatus in the case where the transmission unit transmits the image data to the other apparatus.

An information processing apparatus can be provided in which screen failure is reduced which occurs when display data is transmitted to a destination.

BRIEF DESCRIPTION OF THE DRAWINGS

FIG. 6 is a drawing illustrating an example of a change quality management table.
FIG. 7 is a drawing illustrating an example of a relay apparatus management table.
FIG. 8 is a drawing illustrating an example of a terminal authentication management table.
FIG. 9 is a drawing illustrating an example of a terminal management table.
FIG. 10 is a drawing illustrating an example of a destination list management table.
FIG. 11 is a drawing illustrating an example of a session management table.
FIG. 12 is a drawing illustrating an example of a quality management table.

DETAILED DESCRIPTION OF THE PREFERRED EMBODIMENTS

Figure 1:
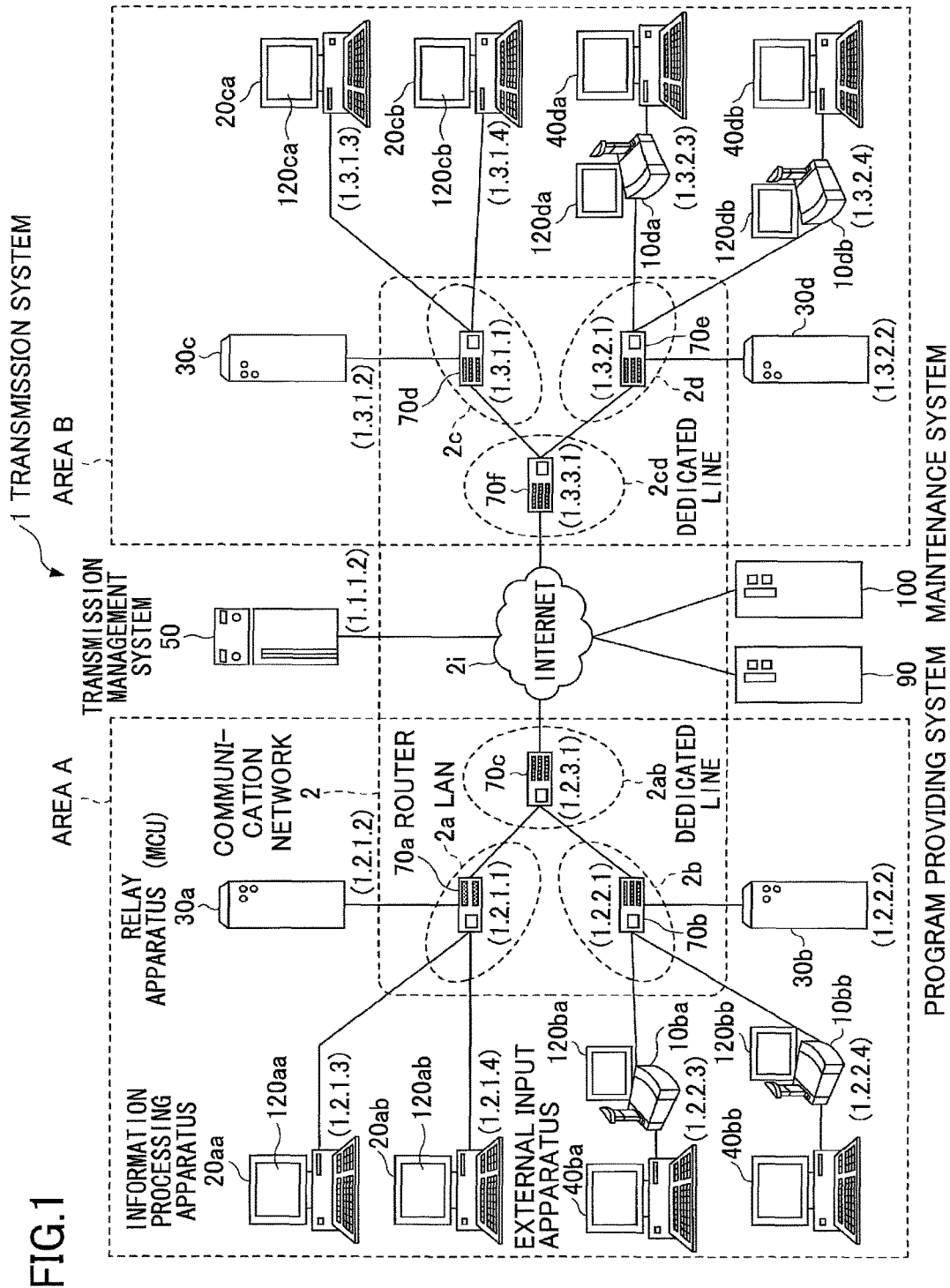
FIG. 1 is a schematic diagram of an overall structure of a transmission system according to an embodiment of the present invention.

In the following, an embodiment of the present invention will be described referring to the drawings. It should be noted that the technical scope of the present invention should not be limited to the embodiment.

Embodiment 1

FIG. 1 is a schematic diagram of an overall structure of a transmission system 1 according to an embodiment 1. In the following, referring to FIG. 1, the embodiment 1 will be described. In the embodiment 1, an information processing apparatus 20 will be described. In the case where a transparent display of the information processing apparatus 20 is set ON, a display load of the information processing apparatus tends to increase easily when audio data, image data and display data are transmitted to a destination terminal, and thus, the transparent display is switched OFF. With the above operation, flickering of a screen during display data sharing can be suppressed.

In general, a transmission system includes a data providing system in which content data is transmitted from a first transmission terminal to a second transmission terminal in one direction via a transmission management system, and a communication system in which information including emotional information is transmitted to each other among a plurality of transmission terminals via a transmission management system. The communication system is used for transmitting information including emotional information among a plurality of communication terminals (corresponding to "information processing apparatus" and "transmission terminal") via a communication management system (corresponding to "transmission management system"). As an example of the communication system, a video conference system, a video telephone system, an audio conference system, an audio telephone system, a personal computer (PC) screen sharing system, or the like can be listed.

In the present embodiment, it is assumed that a video conference system or an interactive white board (IWB) system is an example of the communication system, a video conference management system is an example of the communication management system, and a video conference terminal is an example of the communication terminal. A transmission system, a transmission management system, an information processing apparatus and a transmission terminal will be described. In other words, a transmission terminal and a transmission management system of an embodiment may be applied not only to a video conference system, but also to a communication system or a transmission system. It should be noted that the transmission system 1 is an example of a claimed information processing system.

The transmission system 1 of an embodiment (refer to FIG. 1) includes information processing terminals 20*aa*, 20*ah*, 20*ca* and 20*cb*, transmission terminals 10*ba*, 10*bb*, 10*da*, and 10*db*, display devices 120*ba*, 120*bb*, 120*da* and 120*db* for the corresponding transmission terminals 10*ba*, . . . , 10*db*, external input apparatuses 40*ba*, 40*bb*, 40*da* and 40*db* such as PCs connected to the corresponding transmission terminals 10*ba*, . . . , 10*db*, relay apparatuses 30*a*, 30*b*, 30*c* and 30*d*, a transmission management system 50, and a program providing system 90 and a maintenance system 100. The information processing apparatuses 20*aa*, 20*ab*, 20*ca* and 20*cb* include display devices 120*aa*, 120*ab*, 120*ca*, and 120*cb*, respectively.

It should be noted that, unless otherwise noted, any one of the information processing apparatuses 20*aa*, . . . , 20*cb* is referred to as "information processing apparatus 20", any one of the transmission terminals 10*ba*, . . . , 10*db* is referred to as "transmission terminal 10", any one of the display devices 120*aa*, . . . , 120*db* is referred to as "display device 120", any one of the external input apparatuses 40*ba*, . . . , 40*db* is referred to as "external input apparatus 40", and any one of the relay apparatuses 30*a*, . . . , 30*d* is referred to as "relay apparatus 30". Further, the display device 120 is an example of a display apparatus of the transmission terminal 10.

An information processing apparatus 20 transmits and receives image data, audio data, etc., to and from another information processing apparatus 20 or a transmission terminal 10. Further, a transmission terminal 10 transmits and receives image data, audio data, etc., to and from another transmission terminal 10 or an information processing apparatus 20. In an embodiment, an image of the image data is a video image. However, the image may be not only a video image but also a still image. Further, the image of the image data may include both a video image and a still image. A relay apparatus 30 is used for relaying image data and audio data between an information processing apparatus 20 and a transmission terminal 10. In the case where display data displayed on an image processing apparatus 20 or an external input apparatus 40 is shared, the relay apparatus 30 relays the display data. The transmission management system 50 is used for centralized management of the information processing apparatuses 20, the transmission terminals 10 and the relay apparatuses 30.

An external input apparatus 40 is connected to a transmission terminal 10, and transmits to the transmission terminal 10 display data representing an image displayed on the display apparatus (a display device 216 which will be described later) of the external input apparatus 40.

Further, routers 70a, 70b, 70c, 70d, 70e and 70f are used for selecting an optimal route for transmitting and receiving image data and audio data. In the following description, unless otherwise noted, any of the routers 70a, . . . , 70f is referred to as "router 70". Further, the program providing system 90 includes a hard disk (HD) (not shown). In the HD, an information processing apparatus program for an information processing apparatus 20 to realize various functions or various means, a transmission terminal program for a transmission terminal 10 to realize various functions or various means, a relay apparatus program for a relay apparatus 30 to realize various functions or various means, and a transmission management program for a transmission management system 50 to realize various functions or various means are stored. The program providing system 90 is capable of transmitting the information processing apparatus program, the transmission terminal program, the relay apparatus program, and the transmission management program stored in the HD to the information processing apparatuses 20, the transmission terminals 10, the relay apparatuses 30 and the transmission management system 50, respectively.

Further, the information processing apparatuses 20aa and 20ab, the relay apparatus 30a and the router 70a are connected to each other and capable of communicating with each other via a local area network (LAN) 2a. The transmission terminals 10ba and 10bb, the relay apparatus 30b and the router 70b are connected to each other and capable of communicating with each other via LAN 2b. The LAN 2a and the LAN 2b are connected to each other and capable of communicating with each other via a dedicated line 2ab including the router 70c. The LAN 2a and the LAN 2b are included in a predetermined area A. For example, the area A is Japan, the LAN 2a is included in an office in Tokyo, and the LAN 2b is included in an office in Osaka.

The information processing apparatuses 20ca and 20cb, the relay apparatus 30c and the router 70d are connected to each other and capable of communicating with each other a LAN 2c. The transmission terminals 10da and 10db, the relay apparatus 30d and the router 70e are connected to each other and capable of communicating with each other via a LAN 2d. Further, the LAN 2c and the LAN 2d are connected to each other and capable of communicating with each other by a dedicated line 2cd including the router 70f. The LAN 2c and the LAN 2d are included in a predetermined area B. For example, the area B is the United States, the LAN 2c is included in an office in New York, and the LAN 2d is included in an office in Washington, D.C. The area A and the area B are connected to each other and capable of communicating with each other via the Internet 2i through the respective routers 70c and 70f.

Further, the transmission management system 50, the program providing system 90 and the maintenance system 100 are connected to the transmission terminal 10 and the relay apparatus 30 and capable of communicating with the transmission terminal 10 and the relay apparatus 30 via the Internet 2i. The transmission management system 50, the program providing system 90 and the maintenance system 100 may be included in the area A or the area B, or may be included in an area other than the areas A and B.

In an embodiment, the LAN 2a, the LAN 2b, the dedicated line 2ab, the Internet 2i, the dedicated line 2cd, the LAN 2c, and the LAN 2d are included in a communication network 2.

Further, in FIG. 1, a set of four numbers indicated under each of the information processing apparatuses 20, each of the transmission terminals 10, each of the relay apparatuses 30, the transmission management system 50, each of the routers 70, the program providing system 90 and the maintenance system 100 illustrates a typical IP address of Internet protocol version 4 (IPv4) in a simplified manner. For example, an IP address of the information processing apparatus 20aa is "1. 2. 1. 3". Further, instead of IPv4, IPv6 may be used. But for the purpose of simplicity, IPv4 is used in the description.

<<Hardware Structure>>

Next, a hardware structure according to an embodiment will be described.

Figure 2:
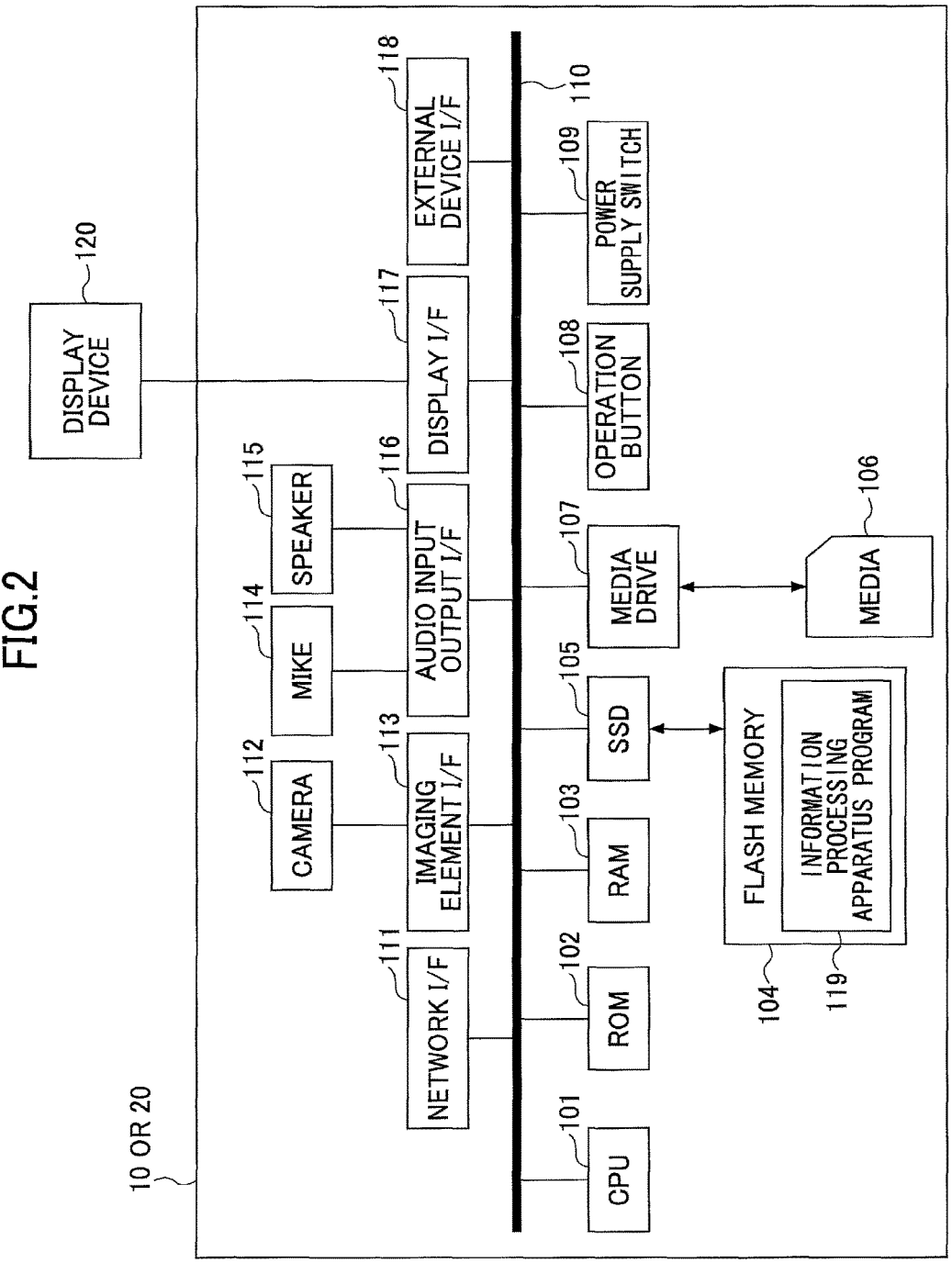
FIG. 2 is an example of a hardware structure diagram of an information processing apparatus included in the transmission system.

FIG. 2 is a hardware structure diagram of an information processing apparatus 20 included in the transmission system 1 according to the embodiment. As shown in FIG. 2, the information processing apparatus 20 includes a central processing unit (CPU) 101 for controlling an entire operation of the information processing apparatus 20, a read only memory (ROM) 102, a random access memory (RAM) 103 used for a work area of the CPU 101, a flash memory 104 for storing data including image data, audio data, etc., a solid state drive (SSD) 105 used for writing and reading data to and from the flash memory 104 according to the control of the CPU 101, in which memory 104 an information processing apparatus program 119 is stored, a media drive 107 used for writing (storing) and reading data to and from recording media 106 such as a flash memory, an operation button 108 used for accepting a user operation, a power supply switch 109 used for switching ON/OFF the power supply of the information processing apparatus 20, a network I/F 111 used for data transmission via the communication network 2 which will be described later, a camera 112 used for taking an image of an object and obtaining image data according to the control of the CPU 101, an imaging element I/F 113 for driving the camera 112, a mike 114 used for inputting audio, a speaker 115 used for outputting the audio, an audio input output I/F 116 used for processing input and output of an audio signal between the mike 114 and the speaker 115 according to the control of the CPU 101, a display I/F 117 for transmitting image data to the display device 120 according to the control of the CPU 101, an external device I/F 118 used for transmitting and receiving data to and from an external device, and a bus line 110 including an address bus and a data bus for electrically connecting the above elements with each other.

It should be noted that the recording media 106 can be attached and detached to and from the information processing apparatus 20. Further, it is not limited to the flash memory 104 that is used, and, electrically erasable and programmable ROM (EEPROM), or the like may be used as long as it is a non-volatile memory to/from which data is written/read according to the control of the CPU 101. Further, the camera 112 includes a solid-state image sensing device used for digitizing an image (video) of an object by converting light to electricity, such as a charge coupled device (CCD) element and a complementary metal oxide semiconductor (CMOS) element. Further, other than the SSD 105, a hard disk drive (HDD) may be used.

Further, the display device 120 includes a liquid crystal element, an organic EL element, etc., used for displaying display data, an image of an object, an icon for an operation, or the like. The display device 120 may be an external type or a built-in type.

Further, the information processing apparatus program may be recorded in a computer-readable recording medium as a file in an installable format or an executable format, and may be distributed.

It should be noted that the camera 112, the mike 114, and the speaker 115 may not be built-in types and may be external types.

Further, because the transmission terminal 10 has a similar hardware structure to that of the information processing apparatus 20, the duplicate descriptions will be omitted. It should be noted that the SSD 105 of the transmission terminal 10 stores a transmission terminal program for controlling the transmission terminal 10.

The information processing apparatus 20 and the transmission terminal 10 may be a PC, a smartphone, a tablet terminal, a mobile telephone, etc.

Figure 3:
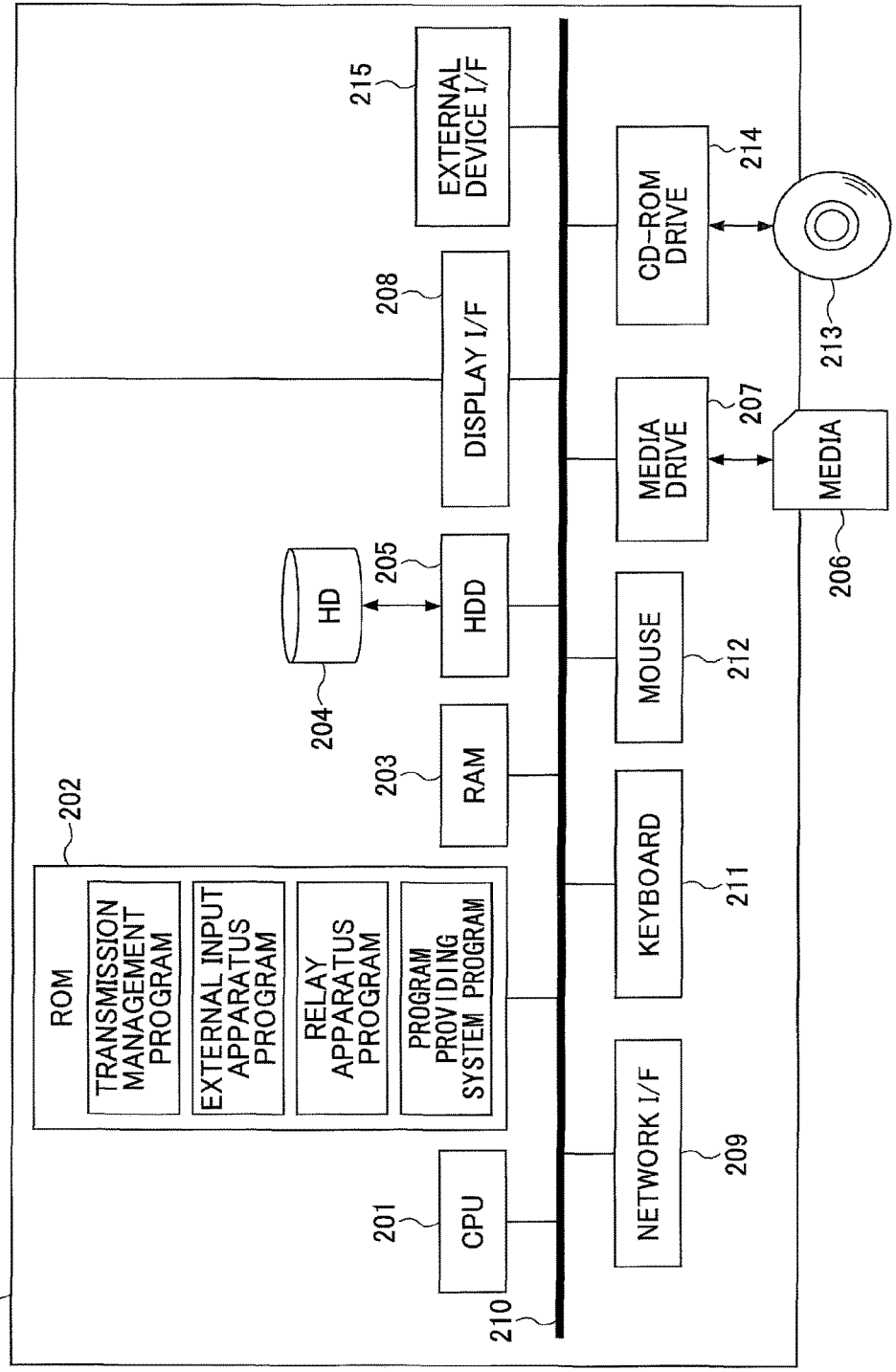
FIG. 3 is an example of a hardware structure diagram of a transmission management system included in the transmission system.

FIG. 3 is a hardware structure diagram of a transmission management system 50 included in the transmission system 1 according to an embodiment. The transmission management system 50 includes a CPU 201 for controlling overall operations of the transmission management system 50; a ROM 202 used for storing a transmission management program; a RAM 203 used for a work area of the CPU 201; a hard disk (HD) 204 for storing various data, a HDD 205 for writing and reading various data to and from the HD 204 according to the control of the CPU 201; a media drive 207 for writing (storing) and reading data to and from recording media 206 including a flash memory; a display I/F 208 for displaying on a display device 216 information including a cursor, a menu, a window, a character, or an image; a network I/F 209 for performing data transmission by using the communication network 2 which will be described later; a keyboard 211 including keys for inputting a character, a numerical value, various instructions, etc.; a mouse 212 for selecting and executing the various instructions, selecting a process target, moving a mouse cursor, or the like; a CD-ROM drive 214 for writing and reading data to and from a compact disc read only memory (CD-ROM) 213 as an example of a detachable recording medium; an external device I/F 215 for transmitting and receiving information to and from an external device; and a bus line 210 such as an address bus, a data bus, etc., for electrically connecting the above elements. It should be noted that a display device 216 is also an example of a display apparatus of the external input apparatus 40.

Further, the transmission management program may be recorded in a computer-readable recording medium including the recording medium 206 and the CD-ROM 213 as a file in an installable format or an executable format, and may be distributed. The transmission management program may be stored in the HD 204.

Further, because the external input apparatus 40 has a similar hardware structure as the transmission management system 50, the duplicate descriptions may be omitted. In the case of the external input apparatus 40, however, an external input apparatus program for controlling the external input apparatus 40 is included in the ROM 202. Also, in this case, the external input apparatus program may be recorded in a computer-readable recording medium including the recording medium 206 and the CD-ROM 213 as a file in an installable format or an executable format, and may be distributed.

Further, because the relay apparatus 30 has a similar hardware structure as the transmission management system 50, the duplicate descriptions may be omitted. In the case of the relay apparatus 30, however, a relay apparatus program for controlling the relay apparatus 30 is included in the ROM 202. Also, in this case, the relay apparatus program may be recorded in a computer-readable recording medium including the recording medium 206 and the CD-ROM 213 as a file in an installable format or an executable format, and may be distributed.

Further, because the program providing system 90 has a similar hardware structure as the transmission management system 50, the duplicate descriptions may be omitted. In the case of the program providing system 90, however, a program providing system program for controlling the program providing system 90 is included in the ROM 202. Also, in this case, the program providing system program may be recorded in a computer-readable recording medium including the recording medium 206 and the CD-ROM 213 as a file in an installable format or an executable format, and may be distributed. It should be noted that the program providing system program may be stored not in the ROM 202 but in the HD 204.

Further, because the maintenance system 100 has a similar hardware structure as the transmission management system 50, the duplicate descriptions may be omitted. The maintenance system 100 is a computer for maintaining or managing at least one of the transmission terminal 10, the relay apparatus 30, the transmission management system 50, and the program providing system 90. For example, in the case where the maintenance system 100 is located in a country and the transmission terminal 10, the relay apparatus 30, the transmission management system 50 or the program providing system 90 is located out of the country, the maintenance system 100 remotely maintains or manages at least one of the transmission terminal 10, the relay apparatus 30, the transmission management system 50 and the program providing system 90 via the communication network 2.

Further, the maintenance system 100 may perform management of a model number, a serial number, a sale destination, a record of maintenance and inspection, a record of failure, or the like, of at least one of the transmission terminal 10, the relay apparatus 30, the transmission management system 50 and the program providing system 90 without using the communication network 2.

It should be noted that, as another example of a detachable recording medium, a computer-readable recording medium including a compact disc recordable (CD-R), a digital versatile disk (DVD), a Blu-ray disc (BD), etc., may be used for storing the programs.

<<Functional Structure>>

Figure 4:
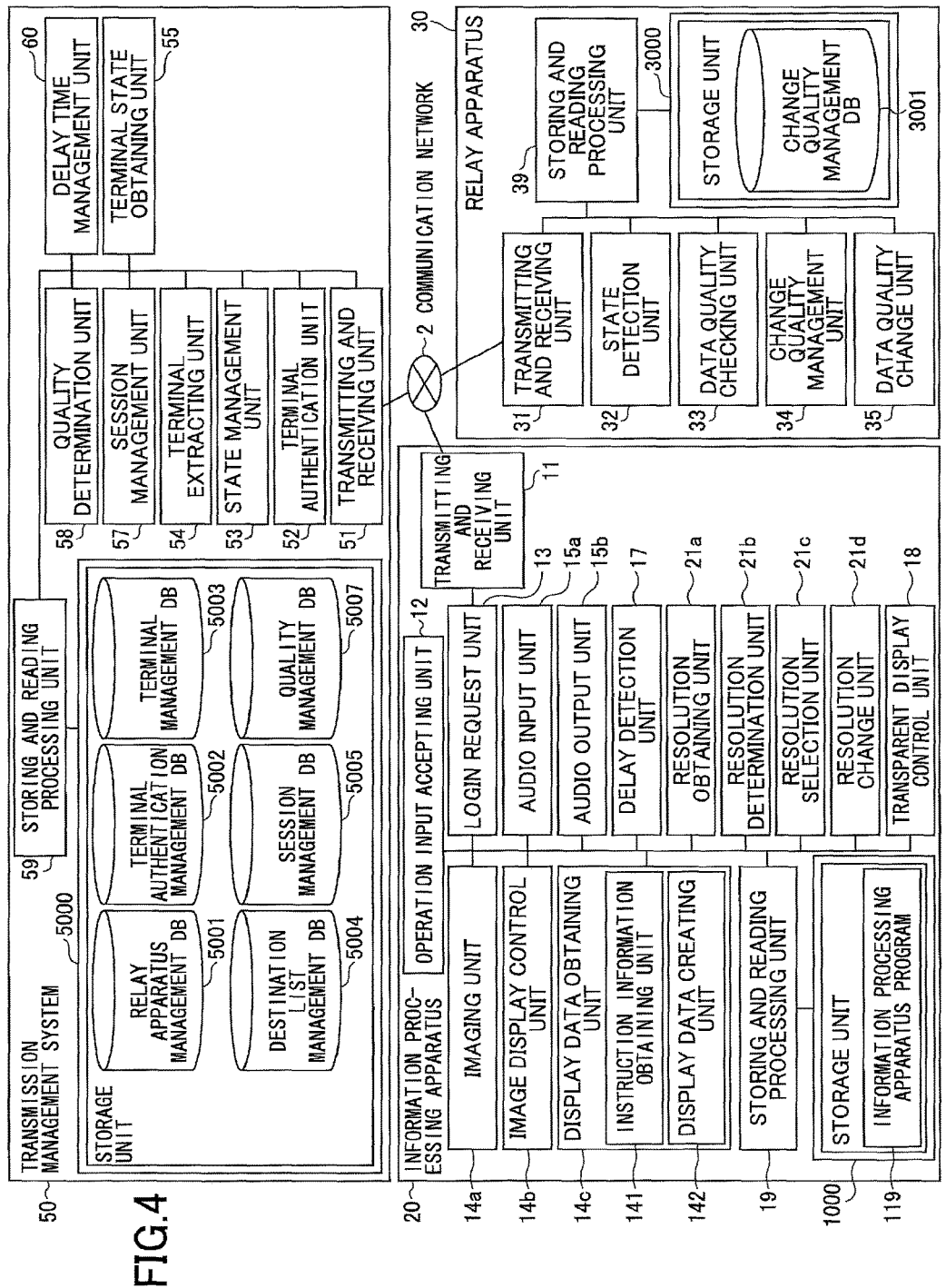
FIG. 4 is an example of a functional block diagram of an information processing apparatus, a relay apparatus, and a transmission management system included in the transmission system.

In the following, referring to FIGS. 4 through 12, a functional structure according to an embodiment will be described. FIG. 4 is a functional block diagram of an information processing apparatus 20, a relay apparatus 30 and a transmission management system 50 included in the transmission system 1 according to an embodiment. In an example shown in FIG. 4, the information processing apparatus 20, the relay apparatus 30 and the management 50 are connected to each other and capable of performing data communications with each other via the communication network 2. It should be noted that the transmission terminal 10, the external input apparatus 40, the program providing system 90 and the maintenance system 100 shown in FIG. 1 are omitted in FIG. 4.

Figure 5A:
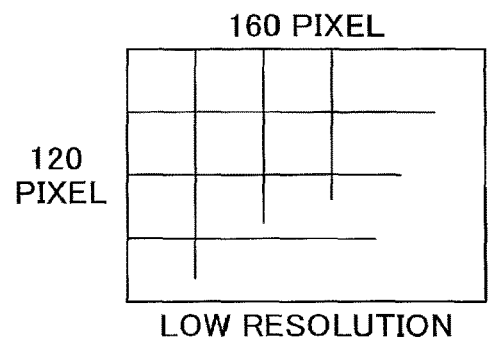
FIG. 5A is a drawing illustrating low resolution.
Figure 5B:
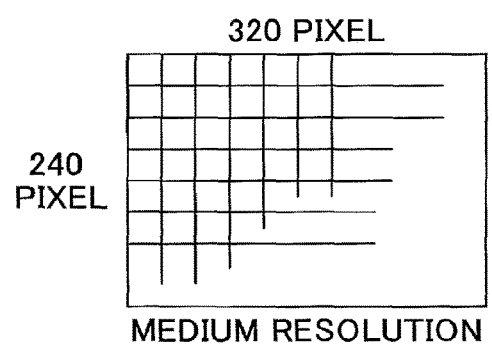
FIG. 5B is a drawing illustrating medium resolution.
Figure 5C:
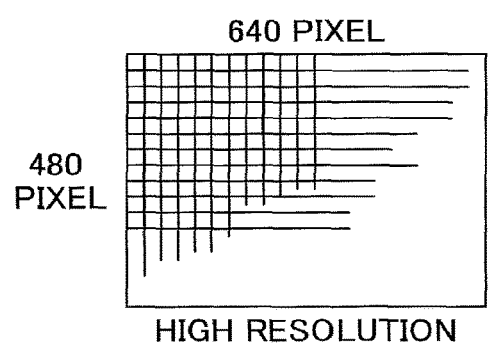
FIG. 5C is a drawing illustrating high resolution.

FIGS. 5A through 5C are drawings illustrating image quality of an image data. Further, FIG. 6 is an example of a change quality management table. FIG. 7 is an example of a relay apparatus management table. FIG. 8 is an example of a terminal authentication management table. FIG. 9 is an example of a terminal management table. FIG. 10 is a destination list management table. FIG. 11 is an example of a session management table. FIG. 12 is an example of a quality management table.

<Functional Structure of Transmission Terminal>

As shown in FIG. 4, the information processing apparatus 20 includes a transmitting and receiving unit 11, an operation input accepting unit 12, a login request unit 13, an imaging unit 14a, an image display control unit 14b, a display data obtaining unit 14c, an audio input unit 15a, an audio output unit 15b, a delay detection unit 17, a transparent display control unit 18, a storing and reading processing unit 19, a resolution obtaining unit 21a, a resolution determination unit 21b, a resolution selection unit 21c, and a resolution change unit 21d. The above units are functions or means which are realized by any of the elements shown in FIG. 2 which operate according to instructions from the CPU 101 which operates according to a program stored in the ROM 102. Further, the transmission terminal 10 includes a memory unit 1000 including the SSD 105 as shown in FIG. 2.

<Functional Units of Transmission Terminal>

Next, functional units of the information processing apparatus 20 will be described in detail. The transmitting and receiving unit 11 of the information processing apparatus 20 is realized by a network I/F 111 shown in FIG. 2, and transmits and receives various data to and from the other information processing apparatus 20, the transmission terminal 10, the relay apparatus 30 and the transmission management system 50 via the communication network 2. The operation input accepting unit 12 is realized by the operation button 108 and the power supply switch 109 shown in FIG. 2, and accepts various inputs from a user. For example, when the user turns ON the power supply switch 109, the operation input accepting unit 12 accepts an input of power supply ON, and turns on the power. Further, the operation input accepting unit 12 accepts resolution information indicating the resolution input by the user.

The login request unit 13 is realized by instructions from the CPU 101 shown in FIG. 2, and, triggered by an operation by the user, automatically transmits to the transmission management system 50 login request information indicating a login request and a current IP address of the information processing apparatus 20 by using the transmitting and receiving unit 11 via the communication network 2.

The imaging unit 14a is realized by the camera 112 and the imaging element I/F 113 shown in FIG. 2, and generates image data representing a taken image of an object. The image display control unit 14b is realized by the display I/F 117 shown in FIG. 2, performs rendering of the image data, and causes the image represented by the image data to be displayed on the display device 120. The display data obtaining unit 14c obtains the image data representing the image displayed on the display device 120. In an embodiment, data representing an image taken by the camera 112 is referred to as "image data". Further, data representing an image displayed on the display device 120, which data is obtained by the display data obtaining unit 14c, is referred to as "display data". It should be noted that the image data and the display data have a format of Joint Photographic Experts Group (JPEG), Bitmap, Graphics Device Interface (GDI), or the like.

The audio input unit 15a is realized by the mike 114 and the audio input output I/F 116 shown in FIG. 2, and outputs audio data of an audio signal converted from voice input by a user. The audio output unit 15b is realized by the speaker 115 and the audio input output I/F 116, and converts the audio data of the audio signal into voice and outputs it.

The delay detection unit 17 is realized by instructions from the CPU 101 shown in FIG. 2, and detects delay time (ms) of the image data or the audio data transmitted from the information processing apparatus 20 or the transmission terminal 10 via the relay apparatus 30. Further, the storing and reading processing unit 19 is realized by the SSD 105 shown in FIG. 2, stores various data in the storage unit 1000, and reads the various data stored in the storage unit 1000.

The resolution obtaining unit 21a obtains available resolutions of the display device 120 connected to the information processing apparatus 20.

The resolution determination unit 21b determines whether the available resolutions obtained by the resolution obtaining unit 21a include a resolution with an aspect ratio other than the standard aspect ratio used for image data transmission. The resolution selection unit 21c selects from the available resolutions a resolution with an aspect ratio other than the standard aspect ratio or a resolution with the standard aspect ratio based on a result determined by the resolution determination unit 21b. The resolution change unit 21d changes the resolution of the display device 120 to the resolution indicated by the resolution information accepted by the operation input accepting unit 12. Here, the resolution indicates a number of pixels in a predetermined length on a display screen, and includes a resolution in the vertical direction and a resolution in the horizontal direction. The transparent display control unit 18 switches ON and OFF the transparent display of a screen output onto the display device 120 by the image display control unit 14b. The "transparent display" means to display an image under a window (an example of a display part) transparently. In other words, image processing is performed by which a part or all of the window becomes translucent. The degree of transparency may be fixed or set by a user. The transparent display allows a user to easily recognize a first window under a second window in the case where the first window is partially overlapped with the second window, and thus, a desktop window under a window can be easily recognized. Further, the transparent display improves the design of a desktop screen.

It should be noted that in the embodiment 1, the load of the transparent display is switched in two levels, ON/OFF. However, in the case where it is possible for the information processing apparatus 20 to control the load of the transparent display in three different levels or more, the transparent display state may be switched in three levels or more.

The storage unit 1000 stores a terminal identification (ID) for identifying an information processing apparatus 20 and a password; image data and audio data; a relay apparatus ID for identifying a relay apparatus 30 for transmitting various data; an IP address of a destination terminal, etc. The terminal ID and the password are input to the information processing apparatus 20 by a user of the information processing apparatus 20, or are stored in the information processing apparatus program 119. Further, the information processing apparatus program 119 is stored in the storage unit 1000. Further, the resolution information indicating the resolution of the display data output by the information processing apparatus 20 is stored in the storage unit 1000.

Further, the terminal ID and the relay apparatus ID, which will be described later, are identification information items such as a language, a character, a symbol, or various marks used for uniquely identifying an information processing apparatus 20 and uniquely identifying a relay apparatus 30, respectively. Further, the terminal ID and the relay apparatus ID may be identification information in which at least two of a language, a character, a symbol, and various marks are combined. Further, in the following description, a "request source terminal" corresponds to an information processing apparatus 20 that requests a start of a video conference, and a "destination terminal" corresponds to an information processing apparatus 20 or a transmission terminal 10 as a video conference destination requested by the request source terminal 20.

<Functional Structure of Relay Apparatus>

Next, functions or means of a relay apparatus 30 will be described. As shown in FIG. 4, the relay apparatus 30 includes a transmitting and receiving unit 31, a state detection unit 32, a data quality checking unit 33, a change quality management unit 34, a data quality change unit 35, and a storing and reading processing unit 39. The above units are functions or means which are realized by any of the elements shown in FIG. 4 which operate according to instructions from CPU 201 which operates according to a program stored in the ROM 202. Further, the terminal 30 includes a storage unit 3000 including any of a ROM 202, a RAM 203 and a HDD 205 shown in FIG. 3.

<<Change Quality Management Table>>

The storage unit 3000 includes a change quality management database (DB) 3001 including a change quality management table 301t as shown in FIG. 6. The change quality management table 301t stores an IP address of an information processing apparatus 20 or a transmission terminal 10 as a relay destination of image data, associated with image quality of the image data which is relayed to the relay destination by the relay apparatus 30.

Here, the resolution of an image of the image data handled by the transmission system 1 according to an embodiment will be described. Referring to FIGS. 5A through 5C, there are an image with low resolution, which serves as a base image and includes 160 pixels in the horizontal direction and 120 pixels in the vertical direction as shown in FIG. 5A; an image with medium resolution, which includes 320 pixels in the horizontal direction and 240 pixels in the vertical direction as shown in FIG. 5B; and an image with high resolution, which includes 640 pixels in the horizontal direction and 480 pixels in the vertical direction as shown in FIG. 5C. In the case where the image data is relayed through a narrow band route, low quality image data only including image data with low resolution which serves to form a base image is relayed.

In the case where the image data is relayed through a relatively wide band route, medium quality image data including image data with low resolution which serves to form a base image and image data with medium resolution is relayed. Further, in the case where the image data is relayed through a very wide band route, high quality image data including image data with low resolution which serves to form a base image, image data with medium resolution, and image data with high resolution is relayed.

In the change quality management table 301t shown in FIG. 6, for example, the image quality of the relayed data (quality of the image) is "high quality" in the case where a relay apparatus 30 relays image data for the transmission terminal 10db (refer to FIG. 1) as a destination terminal with an IP address "1. 3. 2. 4".

<Functional Units of Relay Apparatus>

Next, functional units of the relay apparatus 30 will be described in detail. It should be noted that in the following description, when the functional units of the relay apparatus 30 are described, relations between the functional units and main elements used for realizing the functional units of the relay apparatus 30 will also be described.

The transmitting and receiving unit 31 of the relay apparatus 30 is realized by a network I/F 209 shown in FIG. 3, and transmits and receives various data to and from the information processing apparatus 20, the transmission terminal 10, the other relay apparatus 30 and the transmission management system 50 via the communication network 2. The state detection unit 32 is realized by instructions from the CPU 201 shown in FIG. 3, and detects an operational state of the relay apparatus 30 that includes the state detection unit 32. "ONLINE", "OFFLINE", "TALKING" and "OUT OF ORDER" are included as operational states.

The data quality checking unit 33 is realized by instructions from the CPU 201 shown in FIG. 3, and, checks image quality of the relayed image data by, using an IP address of the destination terminal as a search key, searching the change quality management table 301t, and extracting image quality of the relayed image data corresponding to the IP address. The change quality management unit 34 is realized by instructions from the CPU 201 shown in FIG. 3, and changes contents of the change quality management DB 3001 based on quality information, which will be described later, transmitted by the transmission management system 50. For example, in the case where, when a video conference is held between an information processing apparatus 20aa with a terminal ID "01aa" and a transmission terminal 10db with a terminal ID "01db", a delay in receiving image data occurs at the transmission terminal 10db due to the start of another video conference between an external input apparatus 40bb and an information processing terminal 20ca via the communication network 2, it is necessary for the relay apparatus 30 to change the image quality of the relayed image data from high quality to medium quality. In this case, the contents of the change quality management DB 3001 are changed so that the image quality of the image data relayed by the relay apparatus 30 is changed from high quality to medium quality based on the quality information indicating medium quality.

The data quality change unit 35 is realized by instructions from the CPU 201 shown in FIG. 3, and changes image quality of the image data transmitted from the transmission source terminal based on the changed contents of the change quality management DB 3001. The storing and reading processing unit 39 is realized by the HDD 205 shown in FIG. 3, stores various data in the storage unit 3000, and reads the various data stored in the storage unit 3000.

<Functional Structure of Transmission Management System>

Next, functions or means of a transmission management system 50 will be described. The transmission management system 50 includes a transmitting and receiving unit 51, a terminal authentication unit 52, a state management unit 53, a terminal extracting unit 54, a terminal state obtaining unit 55, a session management unit 57, a quality determination unit 58, a storing and reading processing unit 59, and a delay time management unit 60 as shown in FIG. 4. The above units are functions or means which are realized by any of the elements shown in FIG. 3 which operate according to instructions from the CPU 201 which operates according to a program stored in the ROM 202. Further, the transmission management system 50 includes a storage unit 5000 including the ROM 202, the RAM 203 or the HDD 205 shown in FIG. 3.

<<Relay Apparatus Management Table>>

The storage unit 5000 includes a relay apparatus management database 5001 including a relay apparatus management table 501t as shown in FIG. 7. In the relay apparatus management table 501t, for each relay apparatus 30, a relay apparatus ID of the relay apparatus 30 is associated with an operational state of the relay apparatus 30; receive date and time when state information indicating the operational state is received by the transmission management system 50; an IP address of the relay apparatus 30; and a maximum data transmission rate (Mbps) of the relay apparatus 30. For example, the relay apparatus management table 501t shown in FIG. 7 indicates that an operational state of the relay apparatus 30a with a relay apparatus ID "111a" (refer to FIG. 1) is "ONLINE"; receive date and time when the operational state is received by the transmission management system 50 is "Nov. 10, 2009, 13:00"; an IP address of the relay apparatus 30a is "1. 2. 1. 2."; and a maximum data transmission rate of the relay apparatus 30 is 100 Mbps.

<<Terminal Authentication Management Table>>

The storage unit 5000 includes a terminal authentication management DB 5002 including a terminal authentication management table 502t as shown in FIG. 8. In the terminal authentication management table 502t, for each of the transmission terminals 10 managed by the transmission management system 50, a terminal ID of the transmission terminal 10 is associated with a password. For example, it is illustrated in the terminal authentication management table 502t shown in FIG. 8, that a terminal ID of the information processing apparatus 20aa is "01aa", and a password is "aaaa".

<<Terminal Management Table>>

Further, the storage unit 5000 includes a terminal management DB 5003 including a terminal management table 503t as shown in FIG. 9. In the terminal management table 503t, for each of the information processing apparatuses 20 and the transmission terminals 10, a terminal ID is associated with an operational state of the information processing terminal 20 or the transmission terminal 10; receive date and time when login request information (described later) is received by the transmission management system 50; and an IP address of the information processing apparatus 20 or the transmission terminal 10. For example, in the terminal management table 503t shown in FIG. 9, it is illustrated that an operational state of the information processing apparatus 20aa with a terminal ID "01aa" is "ONLINE"; receive date and time when login request information is received by the transmission management system 50 is "Nov. 10, 2009, 13:40"; and an IP address of the information processing apparatus 20 is "1. 2. 1. 3".

<<Destination List Management Table>>

Further, the storage unit 5000 includes a destination list management DB 5004 including a destination list management table 504t as shown in FIG. 10. In the destination list management table 504t, a terminal ID of a request source terminal that requests a start of a video conference is associated with terminal IDs of all terminals registered as a destination terminal candidate. For example, it is illustrated in the destination list management table 504t shown in FIG. 10, that destination terminal candidates to which the information processing apparatus 20aa with a terminal ID "01aa" can transmit a video conference start request are an information processing apparatus 20ab with a terminal ID "01ab", a transmission terminal 10ba with a terminal ID "01ba", and a transmission terminal 10db with a terminal ID "01db". The destination terminal candidates are updated (added or deleted) according to an addition request or a deletion request from the start request terminal to the transmission management system 50.

<<Session Management Table>>

Further, the memory unit 5000 includes a session management DB 5005 including a session management table 505t as shown in FIG. 11 is included. In the session management table 505t, each selection session ID used for selecting a relay apparatus 30 for a session is associated with a relay apparatus ID of a relay apparatus 30; a terminal ID of a request source terminal; a terminal ID of a destination terminal; delay time (ms); and receive date and time when delay information is received. Here, the delay time (ms) is when image data is received by the destination terminal, and receive data and time when delay information is received is when delay information indicating the delay time transmitted by the destination terminal is received by the transmission management system 50.

For example, it is illustrated in the session management table 505t shown in FIG. 11 that the relay apparatus 30a (relay apparatus ID "111a") is selected for a session established by using a selection session ID "se1", and relays image data and audio data between an information processing apparatus 20aa with a terminal ID "01aa" (refer to FIG. 1) and a transmission terminal 10db with a terminal ID "01db". Further, it is illustrated that the delay time of the image data at the transmission terminal 10db is 200 ms at "14:00 in Nov. 10, 2009".

It should be noted that in the case where a video conference is held between two transmission terminals 10, the receive date and time of the delay information may be transmitted not from the destination terminal 10 but from the request source terminal 10, and stored in the session management table 505t. It should be noted that in the case where a video conference is held among three or more communication terminals, the receive date and time of the delay information transmitted from the communication terminal that receives image data and audio data may be stored in the session management table 505t.

<<Quality Management Table>>

Further, the storage unit 5000 includes a quality management DB 5007 including a quality management table 507t as shown in FIG. 12. In the quality management table, the delay time (ms) of the image data at the start request terminal or at the destination terminal is associated with image quality of the image data (quality of the image) relayed by the relay apparatus 30.

<Functional Units of Transmission Management System>

Next, functional units of the transmission management system 50 will be described in detail. It should be noted that in the following description, when the functional units of the transmission management system 50 are described, relations between the functional units and main elements shown in FIG. 3 used for realizing the functional units of the transmission management system 50 will also be described.

First, the transmitting and receiving unit 51 is realized by a network I/F 209 shown in FIG. 3, and transmits and receives various data to and from the information processing apparatus 20, the transmission terminal 10, the relay apparatus 30 or the other systems (program providing system 90 and/or maintenance system 100) via the communication network 2. The terminal authentication unit 52 performs terminal authentication by searching the terminal authentication management DB 5002 of the storage unit 5000 by using as search keys a terminal ID and a password included in login request information received via the transmitting and receiving unit 51, and determining whether the same terminal ID and the password are stored in the terminal authentication management DB 5002. In order to control an operational state of a login request source terminal, the state management unit 53 associates a terminal ID of the login request source terminal with an operational state of the login request source terminal; receive date and time when the login request information is received by the transmission management system 50; and an IP address of the login request source terminal, and stores them in the terminal management table 503*t*.

The terminal extracting unit 54 extracts a terminal ID by using as a search key a terminal ID of the login request source terminal, searching the destination list management table 504*t*, and extracting a terminal ID of a destination terminal candidate that can communicate with the request source terminal. Further, the terminal extracting unit 54 extracts a terminal ID of another request source terminal for which the terminal ID of the request source terminal is registered as a destination terminal candidate by, using the terminal ID of the login request source terminal as a search key, searching the destination list management table 504*t*.

The terminal state obtaining unit 55 extracts operational states of terminal IDs extracted by the terminal extracting unit 54 by, using as search keys the terminal IDs of the destination terminal candidates extracted by the terminal extracting unit 54, searching the terminal management table 503*t*. With the above operation, the terminal state obtaining unit 55 can obtain operational states of the destination terminal candidates which are capable of communicating with the login request source terminal. Further, the terminal state obtaining unit 55 also obtains an operational state of the login request source terminal by, using as a search key the terminal ID extracted by the terminal extracting unit 54, searching the terminal management table 503*t*.

The session management unit 57 associates a generated selection session ID with a terminal ID of the request source terminal and a terminal ID of the destination terminal, and stores them in the session management DB 5005 (session management table 505*t* in FIG. 11). Further, the session management unit 57 stores a relay apparatus ID of a relay apparatus 30 in the session management table 505*t*.

The quality determination unit 58 determines image quality of image data that are relayed by the relay apparatus 30 by, using the above delay time as a search key, searching the quality management table 507*t*, and extracting corresponding image quality of image data. The storing and reading processing unit 59 is realized by the HDD 205 shown in FIG. 3, stores various data in the storage unit 5000, and reads the various data stored in the storage unit 5000. The delay time management unit 60 searches the terminal management table 503*t* by using an IP address of the destination terminal as a search key, extracts a corresponding terminal ID, and further, stores the delay time indicated by the delay information in a delay time field of a record in the session management table 505*t*, in which record the extracted terminal ID is included.

<Example of Screen Display>

Figure 13:
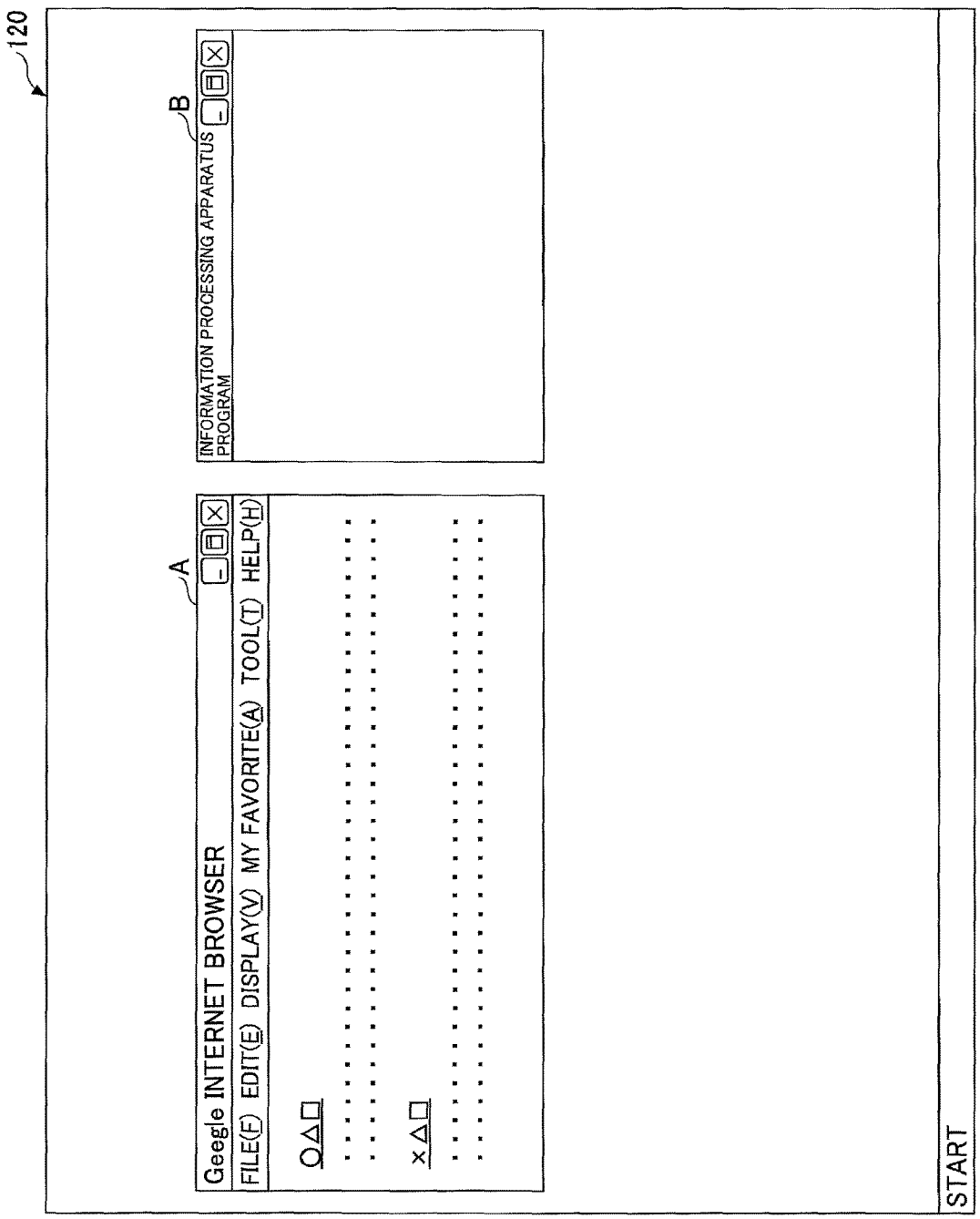
FIG. 13 is a drawing illustrating an example of a desktop screen displayed on a display device.

FIG. 13 is a drawing illustrating an example of a desktop screen displayed on a display device 120. Two windows A and B are displayed on the desktop screen. The window A is created and displayed by any application, and the window B is created and displayed by the image display control unit 14*b* of the information processing apparatus program 119. It should be noted that the information processing apparatus program 119 treats the entire desktop also as a window. In the following, a window created by an application is referred to as "application window", the entire desktop is referred to as "desktop window", and when they are not distinguished, simply referred to as "window".

A window displayed on the display device 12 by the information processing apparatus 20 is controlled by the OS. The information processing apparatus program 119 can obtain identification information (e.g., a handle in Windows (registered trademark)) of a window by requesting the OS to provide the identification information of the window currently displayed by an API. If the identification information of the window is obtained, the name of the title bar can be displayed. It should be noted that although the windows A and B are separated in the figure, the window whose display data is obtained and the window of the information processing apparatus program 119 may be overlapped.

Therefore, the information processing apparatus program 119 can obtain display data of any window selected by a user by identifying the window by, for example, a handle. The window selected by the user is referred to as a "selected window" in the following description.

Figure 14:
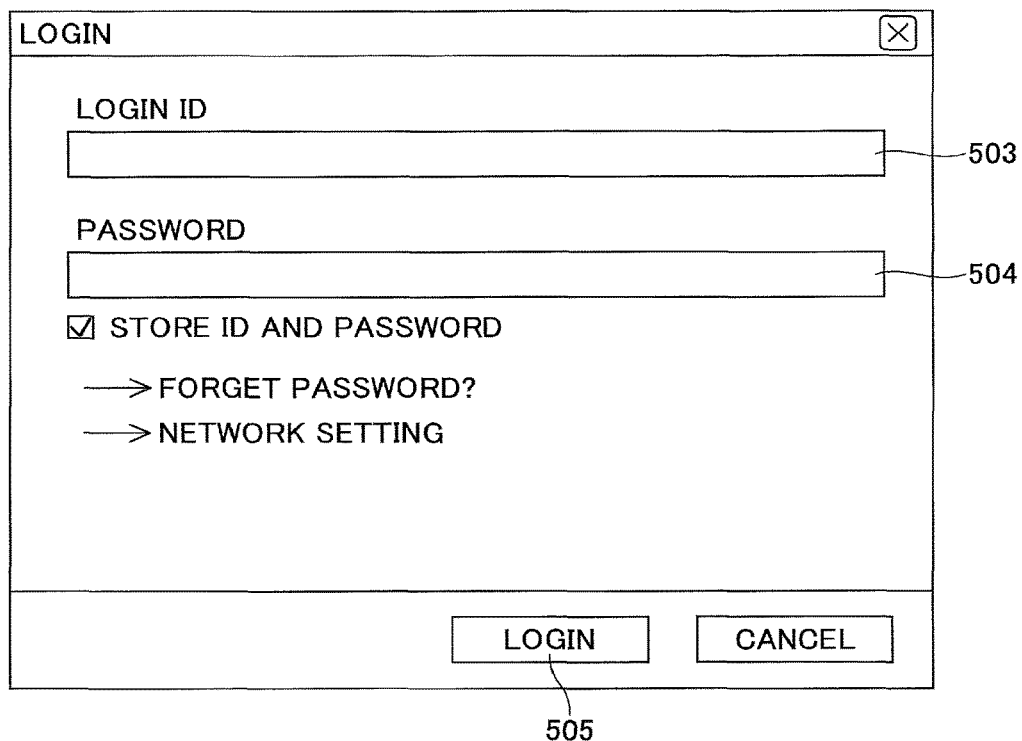
FIG. 14 is a drawing illustrating an example of a login screen displayed by a program for an information processing apparatus.

FIG. 14 is a drawing illustrating an example of a login screen displayed by the information processing apparatus program 119. When the information processing apparatus program 119 is started, a login screen shown in FIG. 14 is displayed (may be displayed independently or may displayed in the window B in FIG. 13). The login screen includes a login ID column 503, a password column 504 and a login button 505. When a user inputs a terminal ID in the login ID column 503 and a password in the password column 504, and presses the login button 505, the login operation is accepted by the operation input accepting unit 12. With the above operation, the login request unit 13 transmits a login request to the transmission management system 50.

Figure 15:
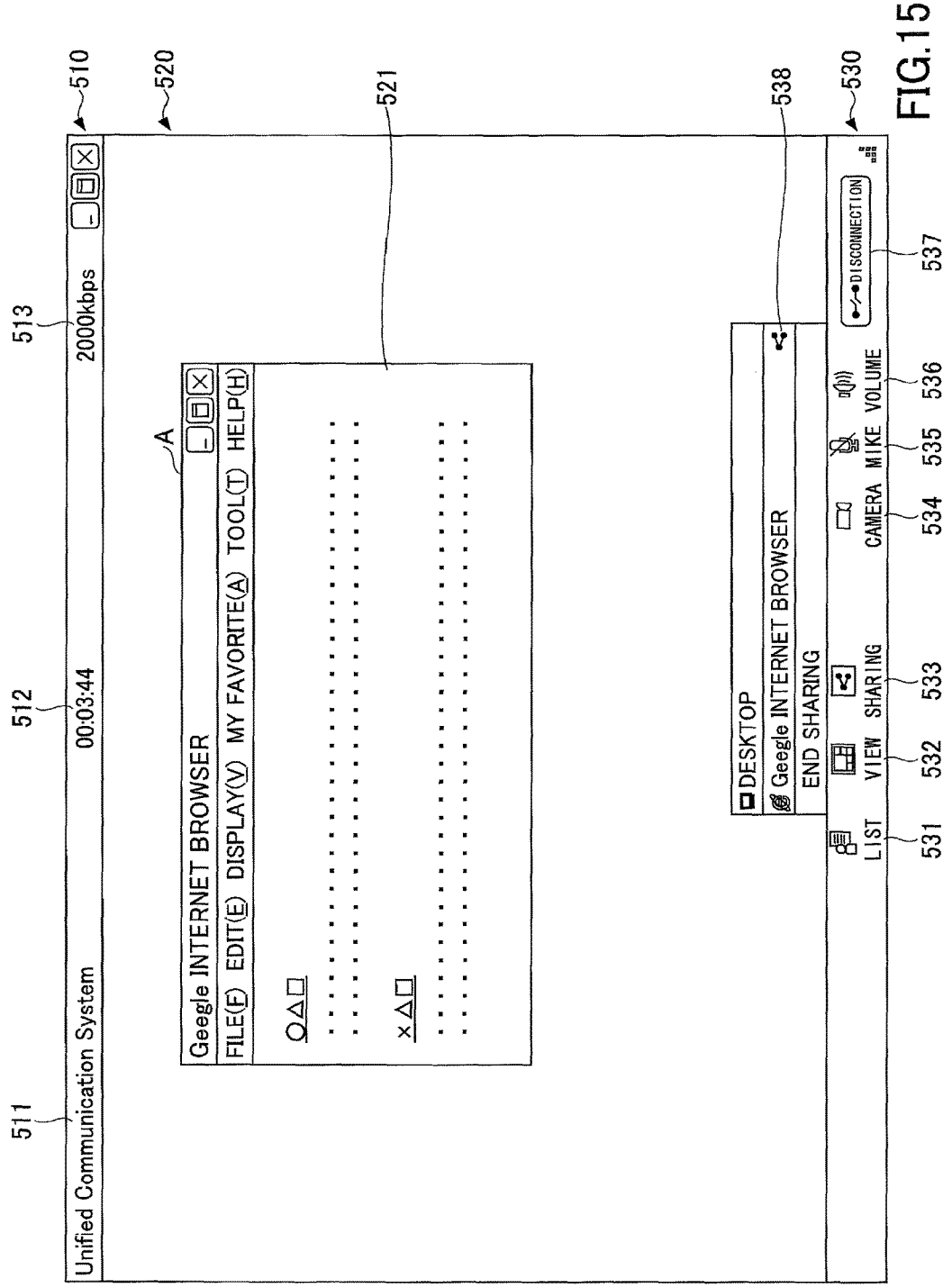
FIG. 15 is a drawing illustrating an example of an application window (main screen) displayed by a program for an information processing apparatus.

FIG. 15 is a drawing illustrating an example of an application window (main screen) displayed by the information processing apparatus program 119. The application window mainly has three areas including a top bar 510, a main display part 520, and a bottom bar 530. In the top bar 510, a name 511 of the information processing apparatus program 119, elapsed time from the start of communications between the information processing apparatus program 119 and the destination terminal, and a communication speed 513 are displayed.

Further, in the bottom bar 530, a list button 531, a view button 532, a sharing button 533, a camera button 534, a mike button 535, a volume button 536, and a connection/disconnection button 537 are displayed. The list button 531 is used for displaying a destination list in step S41 in FIG. 22 which will be described later. The view button 532 is used for displaying selectable display formats of the main display part 520. The user can choose to display the display data and one or more (as many as a number of destination terminals) image data items, display only the display data, or display only image data by pressing the view button 532 and selecting a display format. The sharing button 533 is used for displaying a list of windows with which display data can be shared, and starting sharing display data with a selected window. The camera button 534 is used for switching ON/OFF taking a picture by the camera. The mike button 535 is used for switching ON/OFF collecting sound by the mike. The volume button 536 is used for adjusting volume output from the speaker. The connection/disconnection button 537 is used for starting a video conference (login) and for ending the video conference (logoff). The connection/ disconnection button 538 is displayed as "connection" before login, and displayed as "disconnection" after login.

FIG. 15 shows a state in which the sharing button 533 is pressed. As a result, a list of display data sharing available windows is displayed. In other words, "Geegle Internet Browser" and "desktop" are displayed. The application window of the "Geegle Internet Browser" corresponds to the window A in FIG. 13. Therefore, an icon 538 indicating the sharing is displayed at the right end of the "Geegle Internet Browser". In the case where the user wants to share the display data of another window ("desktop" in the figure), the user selects "desktop".

Further, a menu "sharing end", used for indicating that the display data is already being shared and used for ending the sharing, is displayed. The user selects the menu "sharing end" in the case where the user ends the sharing.

In the main display part 520, the display data 521 of the window A ("Geegle Internet Browser"), of which display data is currently shared, is displayed. Further, the display data 521 is transmitted to the transmission terminal 10*db* as a destination terminal, and is shared with the transmission terminal 10*db*.

Figure 16:
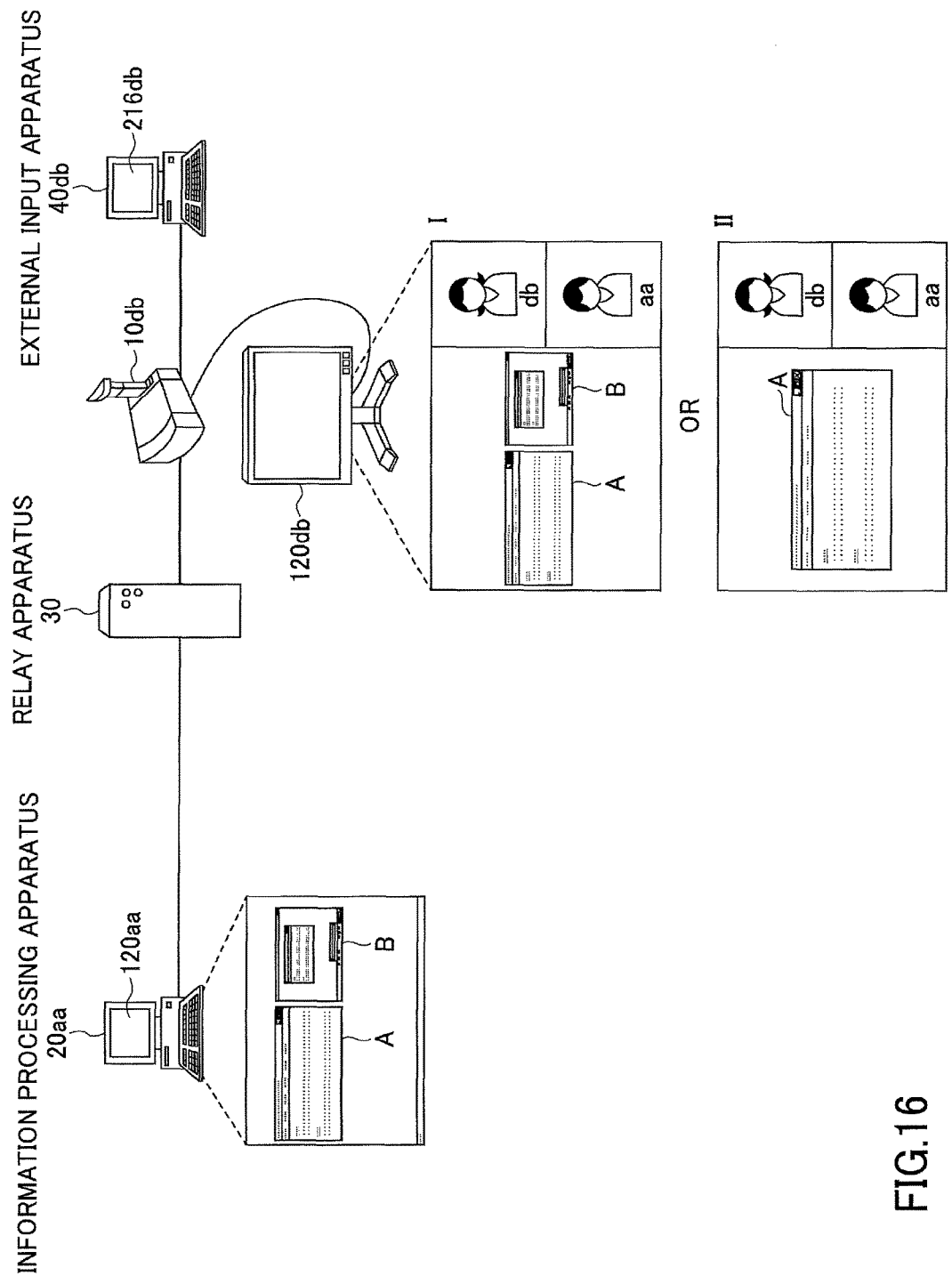
FIG. 16 is a drawing of an example illustrating display data sharing.

FIG. 16 is a drawing of an example illustrating display data sharing. The information processing apparatus 20*aa* and the transmission terminal 10*db* are connected via the relay apparatus 30. The external input apparatus 40*db* and the display device 120*db* are connected to the transmission terminal 10*db*.

The window A and the window B are displayed on the display device 120*aa* of the information processing apparatus 20*aa*. The window B is an application window created by the information processing apparatus program 119. In the case where a user selects the window A by using the sharing button 533, the display data obtaining unit 14*c* obtains display data of the window A and the transmitting and receiving unit 11 transmits the display data to the transmission terminal 10*db*. In the case where the user selects the "desktop" by using the sharing button 533, the transmitting and receiving unit 11 transmits data of the desktop window to the transmission terminal 10*db*.

On the screen I of the transmission terminal 10*db*, the display data of the desktop window, image data taken by the camera 112 of the information processing apparatus 20*aa*, and image data taken by the camera 112 of the transmission terminal 10*db* are displayed. In other words, the display device 120*db* is divided into three areas, and the display data and two image data items are displayed.

On the screen II of the transmission terminal 10*db*, image data taken by the camera 112 of the information processing apparatus 20*aa*, and image data taken by the camera 112 of the transmission terminal 10*db* are displayed.

<Combining Icon Image (Mouse)>

When the display data obtaining unit 14*c* obtains the selected window, an image of a mouse cursor may not be obtained depending on an information processing apparatus 20. Therefore, it is preferable that, in the case where the display data obtaining unit 14*c* obtains the display data of the selected window in which a mouse cursor is included, the mouse cursor be combined with the display data.

As shown in FIG. 4, the display data obtaining unit 14*c* includes an instruction information obtaining unit 141 and a display data creating unit 142. The instruction information obtaining unit 141 obtains instruction information such as position information of a mouse cursor, an icon image 17*g* (FIG. 17) of the mouse cursor, etc.

The instruction information includes a coordinate data 17*h* (FIG. 17) of the mouse cursor on the screen, or includes the coordinate data 17*h* of the mouse cursor on the screen and the icon image 17*g*. The coordinate data 17*h* of the mouse cursor can be obtained by a request to the OS by using an API. The icon image 17*g* of the mouse cursor may be obtained from the OS, or the icon image 17*g* of a known mouse cursor may be provided beforehand as image data.

The display data creating unit 142 combines the icon image 17*g* with the display data. The information processing apparatus 20 transmits the combined display data to the transmission terminal 10*db*, etc. Therefore, users can share the position information the mouse cursor specifies in the display data on the screen.

A method of combining the icon image 17*g* of the mouse cursor in the case where it is combined with the display data of the desktop window is different from a method in the case where it is combined with the display data of the application window.

In the Case of Combining with the Display Data of the Desktop Window

Figure 17:
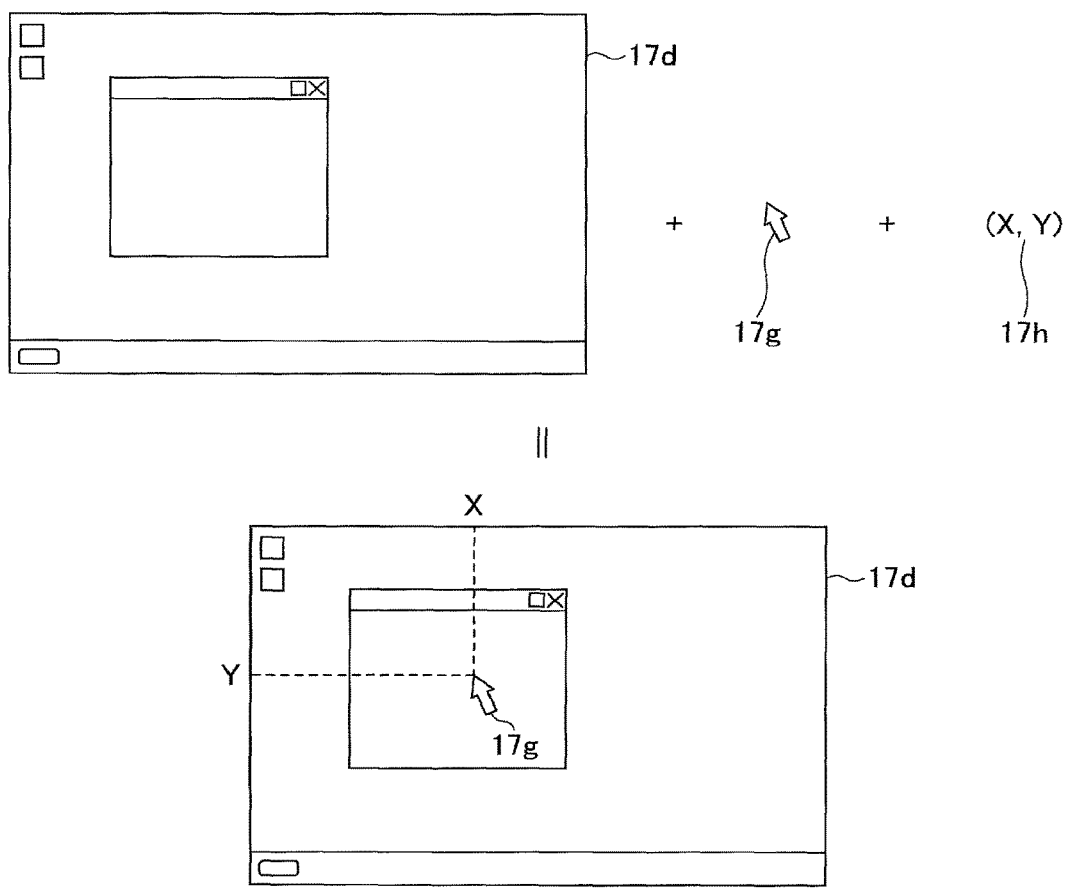
FIG. 17 is a drawing of an example illustrating combining an icon image of a mouse cursor with display data.

FIG. 17 is a drawing of an example illustrating combining the icon image 17*g* of the mouse cursor with display data 17*d*. The display data 17*d* in FIG. 17 corresponds to an entire screen displayed on the display device 120*aa* by the information processing apparatus 20*aa*. The mouse cursor can move around the entire desktop screen.

The instruction information obtaining unit 141 obtains the icon image 17*g* of the mouse cursor and the coordinate data 17*h* of the mouse cursor. The coordinate data 17*h* is represented by using a Cartesian coordinate system, and is a coordinate set indicating in pixel units a two-dimensional position of the mouse cursor with respect to the top left corner as an origin.

Therefore, it is possible for the display data creating unit 142 to combine the mouse cursor with the display data 17*d* by, for example, placing the tip portion of the mouse cursor at a position of the display data 17*d* indicated by the coordinate data 17*h*. It should be noted that to combine the mouse cursor means to place the icon image 17*g* of the mouse cursor in the display data 17*d* (to replace the pixel values of the overlapped pixels) to obtain combined image data.

In the Case of Combining with the Display Data of an Application Window

Figure 18:
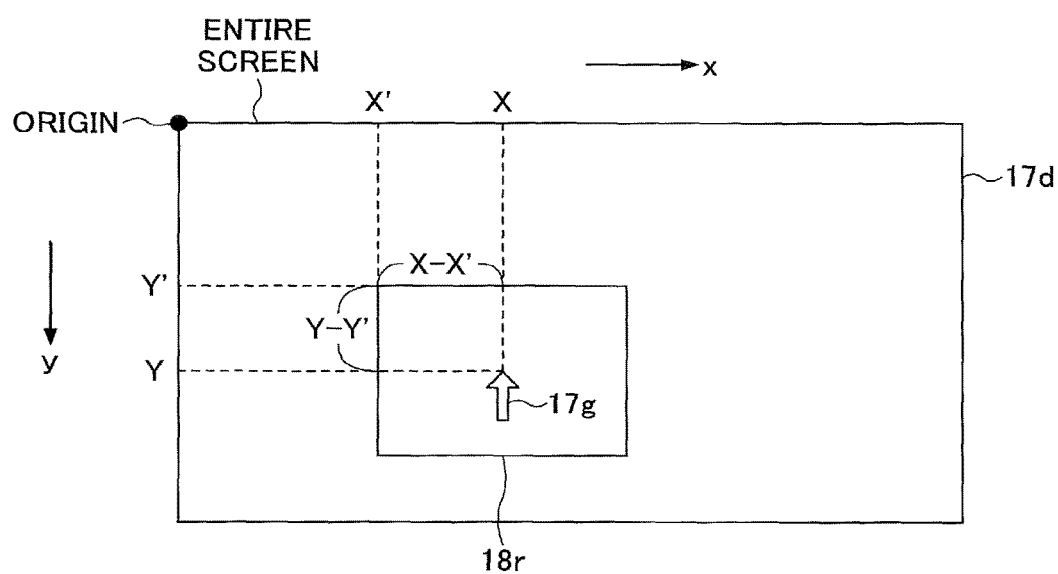
FIG. 18 is a drawing of an example illustrating combining an icon image of a mouse cursor with display data.

FIG. 18 is a drawing of an example illustrating combining the icon image 17*g* of the mouse cursor with display data. Coordinates (X, Y) of the mouse cursor have a top left corner of the desktop screen as an origin. However, the selected window is merely a partial area of the desktop screen. Therefore, if the icon image 17*g* is combined with display data 17*d* of a selected window by using the coordinates (X, Y), then the icon image 17*g* is placed at the coordinates (X, Y) with respect to the top left corner of the selected window, the coordinates of the top left corner of the selected window being (X', Y'), and thus, the position of the icon image 17*g* in the display data 17*d* is different from an intended position.

Therefore, the instruction information obtaining unit 141 adjusts the coordinate data 17*h* of the mouse cursor as shown below in the case where the selected window is not the desktop window but the application window.

$$X = X - X'$$

$$Y = Y - Y'$$

With the above operation, relative position between the display data 17d and the icon data 17g can be maintained and the icon image 17g can be combined with the display data 17d.

Figure 19:
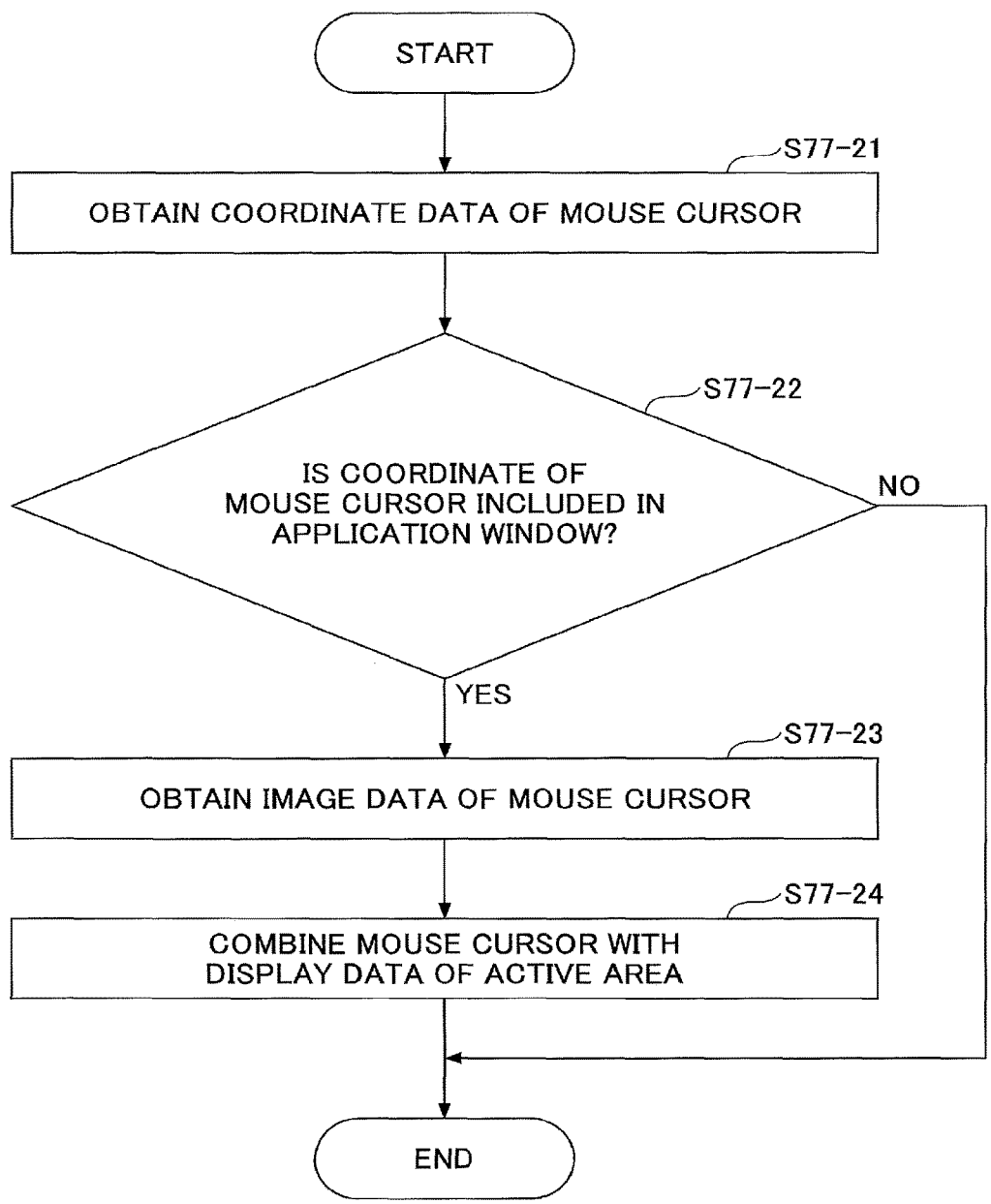
FIG. 19 is a flowchart of an example of a procedure of a display data obtaining unit for combining an icon image of a mouse cursor with the display data.

FIG. 19 is a flowchart of an example of a procedure of the display data obtaining unit 14c for combining the icon image 17g of the mouse cursor with the display data. A process shown in FIG. 19 is performed in step S77-2 in a process shown in FIG. 23.

The instruction information obtaining unit 141 obtains the coordinate data 17h of the mouse cursor (S77-21). In the case of the display data of the desktop window, the icon image 17g is combined with the display data.

The instruction information obtaining unit 141 determines whether the coordinate data 17h obtained in step S77-21 is included in the application window (S77-22).

In the case where the coordinate data 17h is not included in the application window (NO in S77-22), it is not necessary to combine the icon image 17g with the display data. Therefore, the display data creating unit 142 ends its process without combining the icon image 17g of the mouse cursor with the display data.

In the case where the coordinate data 17h is included in the application window (YES in S77-22), the instruction information obtaining unit 141 obtains the icon image 17g of the mouse cursor (S77-23).

Next, the display data creating unit 142 combines the icon image 17g obtained in step S77-23 with the display data of the selected window and ends its process (S77-24). In other words, the display data creating unit 142 refers to the coordinates (X, Y) of the tip portion of the mouse cursor and the coordinates (X', Y') of the left top corner of the active area 18r. Further, the display data creating unit 142 combines the icon image 17g of the mouse cursor with the display data in which only the image of the active area 18r is included, by placing the icon image 17g at a position ((X-X'), (Y-Y')) having the top left corner of the active area 18r as an origin.

With the above operation, the mouse cursor can be displayed with the display data. It should be noted that it is assumed that an application window is selected in S77-22 in FIG. 19. However, the combining process in the case where an application window is selected can be always applied, and in the case where the desktop window is selected, it can be assumed that X'=0 and Y'=0.

<<Process and Operation of Embodiment>>

Figure 20:
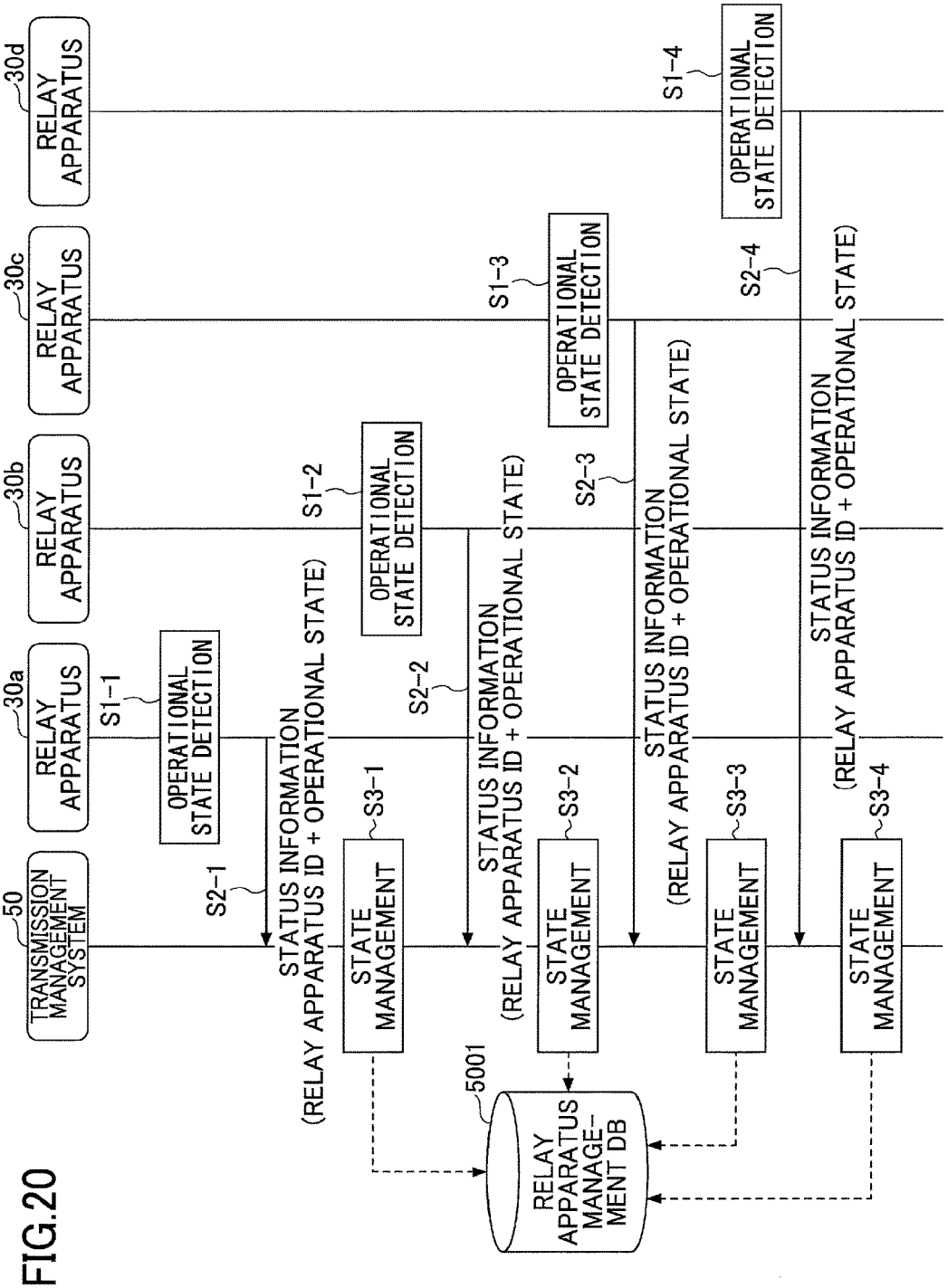
FIG. 20 is a sequence diagram illustrating an example of a process for controlling status information indicating operational states of relay apparatuses transmitted from the relay apparatuses to a transmission management system.
Figure 21:
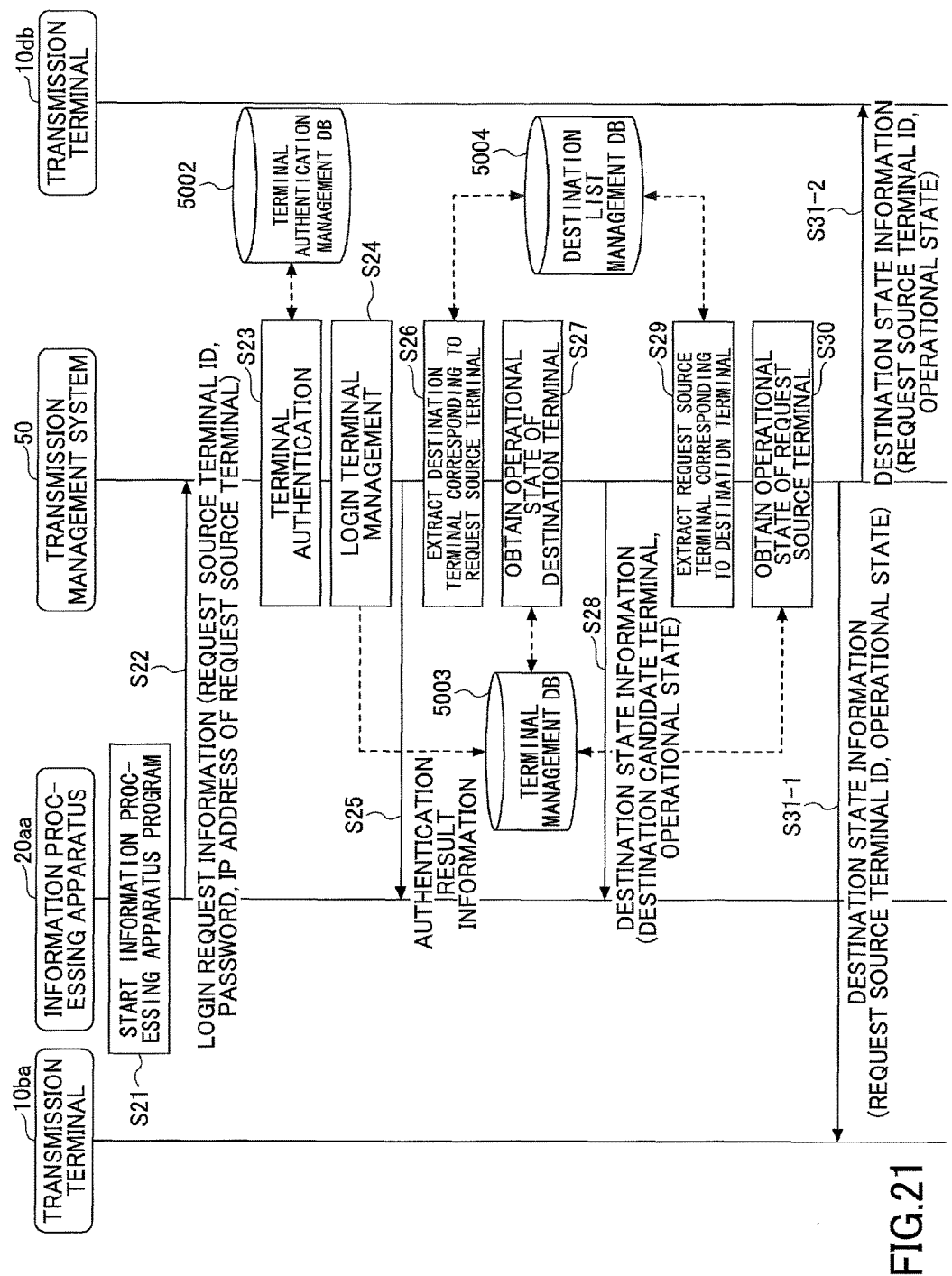
FIG. 21 is a sequence diagram illustrating an example of a preparation stage process for starting communications between transmission terminals.
Figure 22:
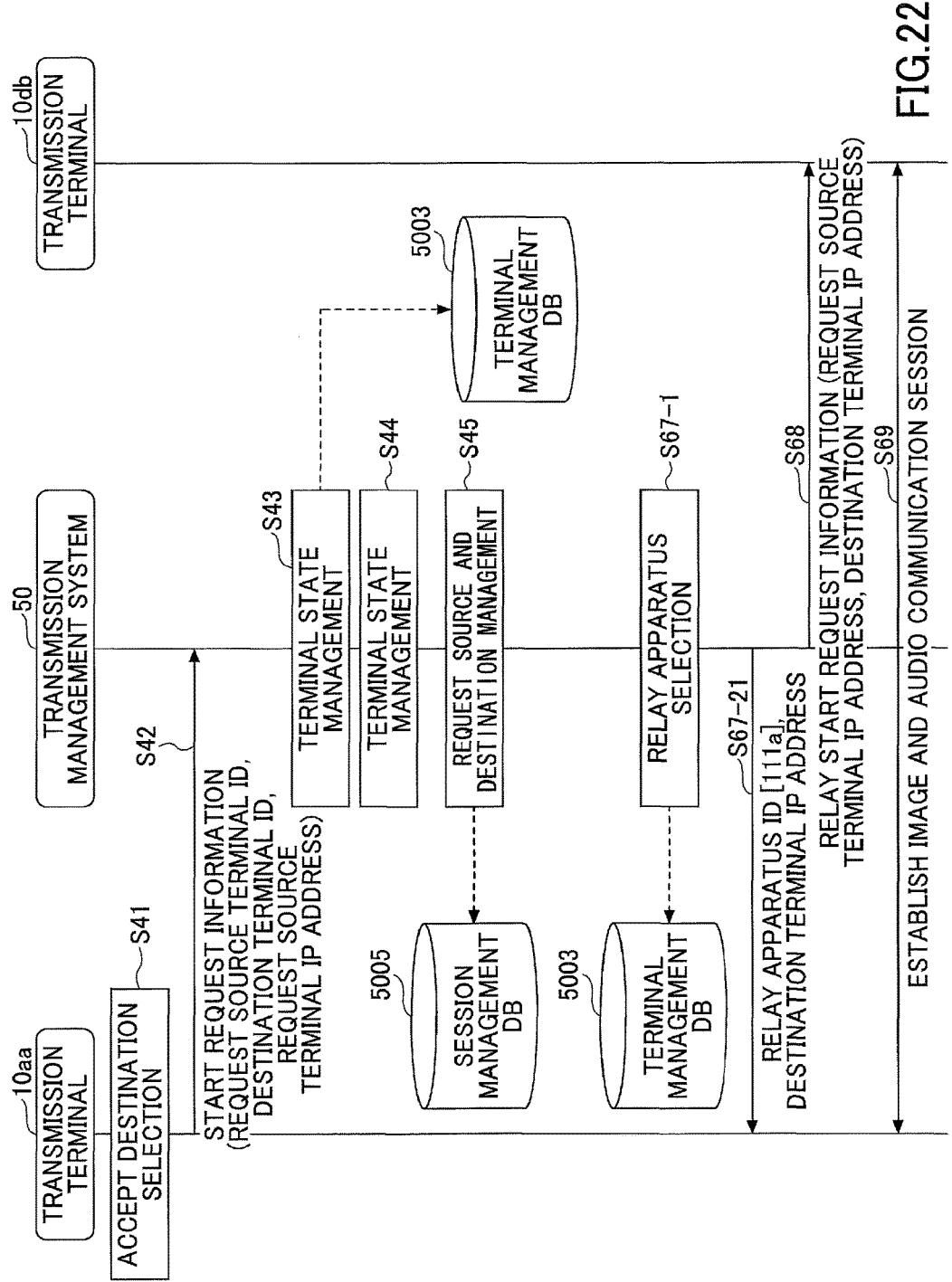
FIG. 22 is a sequence diagram illustrating an example of a process of a transmission terminal for establishing a session.
Figure 23:
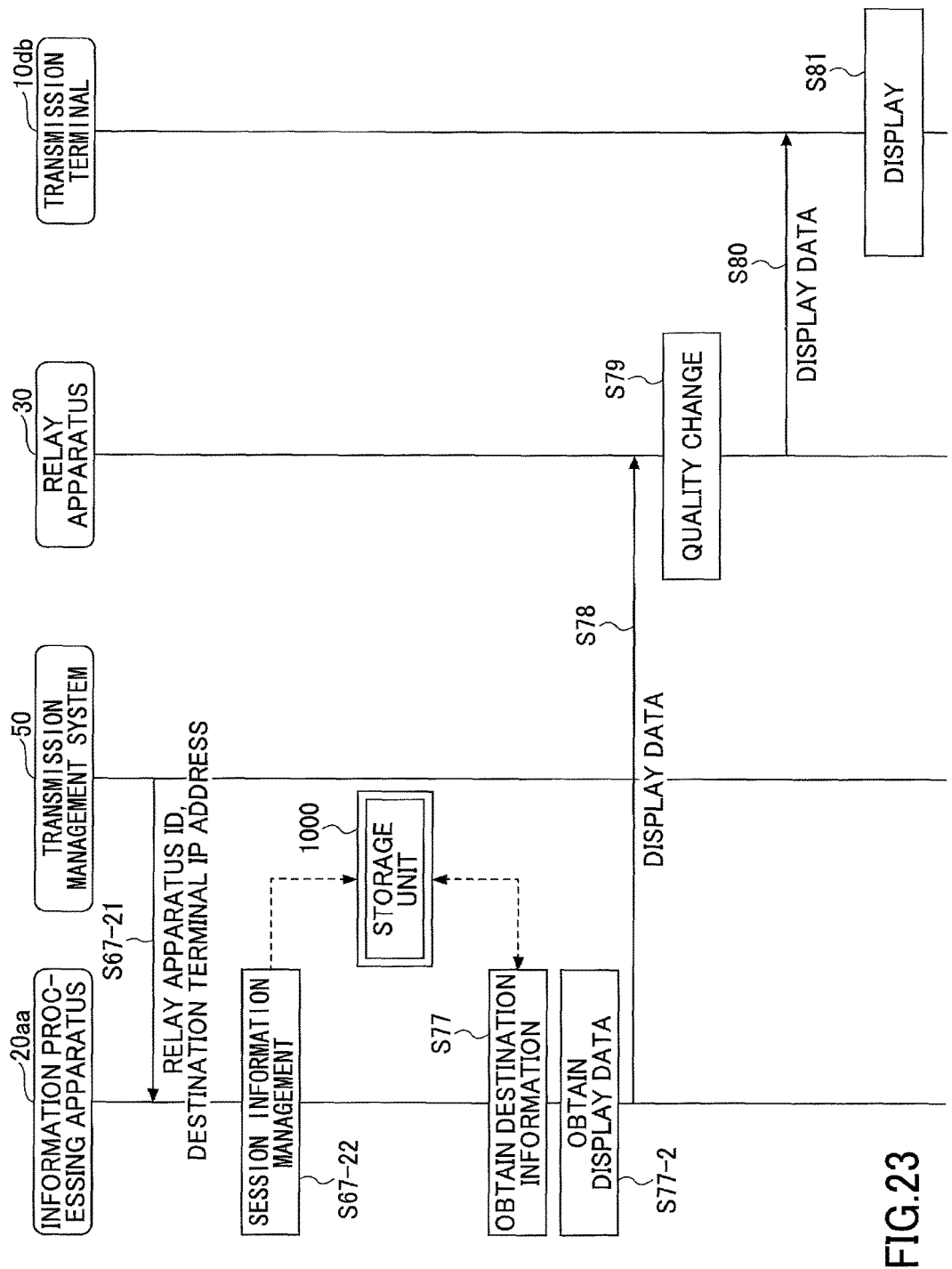
FIG. 23 is a sequence diagram illustrating an example of a process for causing a destination transmission terminal of the conference to display the display data displayed by an external input apparatus.
Figure 24:
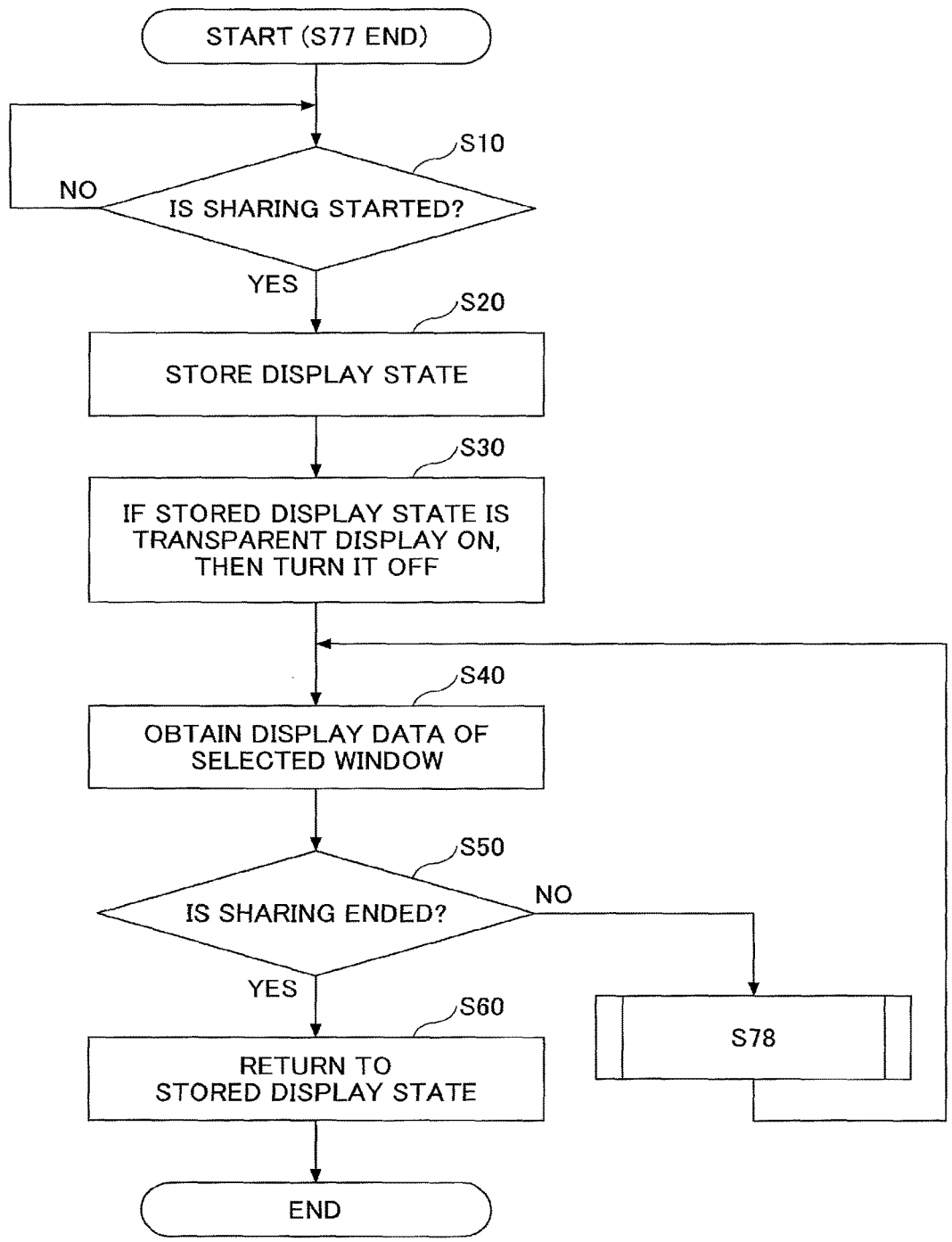
FIG. 24 is a flowchart of an example of a procedure for obtaining display data.

Next, referring to FIG. 20 through FIG. 24, processes and operations performed in the transmission system 1 according to an embodiment will be described. FIG. 20 is a sequence diagram illustrating an example of a process for controlling status information indicating operational states of relay apparatuses 30 transmitted from the relay apparatuses 30 to the transmission management system 50. FIG. 21 is a sequence diagram illustrating an example of a preparation stage process for starting communications between the information processing apparatus 20 and another information processing apparatus 20 or a transmission terminal 10. FIG. 22 is a sequence diagram illustrating an example of a process of a transmission terminal for establishing a session. FIG. 23 is a sequence diagram illustrating an example of a process for causing the other information processing apparatus 20 or the transmission terminal 10 as a destination of a conference to display the display data displayed by the information processing apparatus 20. FIG. 24 is a flowchart of an example of a procedure for obtaining display data.

First, referring to FIG. 20, a process for controlling status information indicating operational states of relay apparatuses 30 transmitted from the relay apparatuses 30 to the transmission management system 50 will be described. In each of the relay apparatuses 30 (30a through 30d), the state detection unit 32 periodically detects an operational state of its relay apparatus 30 (S1-1 through S1-4). Further, in order for the transmission management system 50 to control operational states of the relay apparatuses 30 in real time, the transmitting and receiving unit 31 of each relay apparatus 30 periodically transmits status information of its relay apparatus 30 to the transmission management system 50 via the communication network 2 (steps S2-1 through S2-4). The status information includes a relay apparatus ID of the relay apparatus 30 and the operational state of the relay apparatus 30 corresponding to the relay apparatus ID detected by the state detecting unit 32. It should be noted that it is assumed in the following embodiment that the relay apparatuses 30a, 30b and 30d are in "ONLINE" state and operating normally, and the relay apparatus 30c is operating but is in "OFFLINE" state because there is some problem in a program used for the relay apparatus 30c to perform its operation.

Next, the transmission management system 50 receives the status information transmitted from the relay apparatuses 30a through 30d via the transmitting and receiving unit 51, and stores the status information associated with a relay apparatus ID in the relay apparatus management DB 5001 (relay apparatus management table 501t in FIG. 7) of the storage unit 5000 via the storing and reading processing unit 59 (steps S3-1 through S3-4). With the above operation, for each relay apparatus ID, any one of operational states "ONLINE", "OFFLINE" and "OUT OF ORDER" is stored in the relay apparatus management table 501t. At this time, for each relay apparatus ID, receive date and time when the status information is received by the transmission management system 50 is also stored. It should be noted that in the case where status information is not transmitted from a relay apparatus 30, a field of an operational state and a field of receive date and time in the record of the relay apparatus management table 501t may be blank or the fields may maintain the previous operational state and the previous receive date and time.

Next, referring to FIG. 21, a preparation stage process before starting communications between the information processing apparatus 20aa and the transmission terminals 10ba and 10db will be described. First, when a user starts the information processing apparatus program 119, a login screen shown in FIG. 14 is displayed. The user inputs a terminal ID and a password, and presses the login button 505 (step S21).

Next, triggered by pressing of the login button 505, the login request unit 13 automatically transmits from the transmitting and receiving unit 11 login request information indicating a login request to the transmission management system 50 via the communication network 2 (step S22). The login request information includes a terminal ID used for identifying the information processing apparatus 20aa as a request source and a password. The terminal ID and the password are read from the storage unit 100 via the storing and reading processing unit 19 and transmitted to the transmitting and receiving unit 11. It should be noted that when the login request information is transmitted from the information processing apparatus 20aa to the transmission management system 50 as the receiver, the transmission management system 50 can obtain an IP address of the sender, namely the information processing apparatus 20aa.

Next, the terminal authentication unit 52 of the transmission management system 50 performs terminal authentication by searching the terminal authentication management DB 5002 (terminal authentication management table 502*t* in FIG. 8) of the storage unit 5000 by using as search keys the terminal ID and the password included in the login request information received via the transmitting and receiving unit 51, and determining whether the same terminal ID and the password are stored in the terminal authentication management DB 5002 (step S23). In the case where it is determined that the same terminal ID and the password are stored in the terminal authentication management DB 5002 and that the login request is from an information processing apparatus 20 or a transmission terminal 10 that has a proper use right, the status management unit 53 associates the terminal ID of the information processing apparatus 20 with the operational state, receive date and time when the login request information is received, and an IP address of the information processing apparatus 20*aa*, and stores them in the terminal management DB 5003 (terminal management table 503*t* in FIG. 9) (step S24). With the above operation, the operational state "ONLINE", receive date and time "2009. 11. 10. 13:40" and a terminal IP address "1. 2. 1. 3" are associated with the terminal ID "01*aa*" of the information processing apparatus 20*aa* and stored in the terminal management table 503*t* (FIG. 9).

Next, the transmitting and receiving unit 51 of the transmission management system 50 transmits authentication result information indicating the authentication result obtained by the terminal authentication unit 52 to the information processing apparatus 20*aa* as a request source of the login request via the communication network 2 (step S25). The description continues for the case where it is determined by the terminal authentication unit 52 that the terminal has a proper use right.

The terminal extracting unit 54 of the transmission management system 50 extracts a terminal ID by, using as a search key a terminal ID "01*aa*" of the information processing apparatus 20*aa* requesting login, searching the destination list management table 504*t*, and reading a terminal ID of a destination terminal candidate that can communicate with the information processing apparatus 20*aa* (step S26). Here, terminal IDs "01*ab*", "01*ba*" and "01*db*" of the information processing apparatus 20*ab*, the transmission terminal 10*ba* and the transmission terminal 10*db* which can be a destination terminal for the information processing apparatus 20*aa* with a terminal ID "01*aa*" are extracted.

Next, the terminal state obtaining unit 55 obtains operational states of the destination terminals (the information processing apparatus 20*ab*, the transmission terminal 10*ba*, and the transmission terminal 10*db*) by, using as search keys the terminal IDs ("01*ab*", "01*ba*", "01*db*") of the destination terminal candidates extracted by the terminal extracting unit 54, searching the terminal management table 503*t*, and reading operational states ("OFFLINE", "ONLINE", "ONLINE") of the terminal IDs extracted by the terminal extracting unit 54 (step S27).

Next, the transmitting and receiving unit 51 transmits destination state information including the terminal IDs ("01*ab*", "01*ba*", "01*db*") used as search keys in step S27 and the operational states ("OFFLINE", "ONLINE", "ONLINE") of the corresponding terminals (the information processing apparatus 20*ab*, the transmission terminal 10*ba*, and the transmission terminal 10*db*) via the communication network 2 (step S28). With the above operation, the information processing apparatus 20*aa* can obtain the current operational states ("OFFLINE", "ONLINE", "ONLINE") of the destination terminal candidates, the information processing apparatus 20*ab*, the transmission terminal 10*ba*, and the transmission terminal 10*db*, that can communicate with the information processing apparatus 20*aa*.

Further, the terminal extracting unit 54 of the transmission management system 50 searches the destination list management table 504*t* by using as a search key a terminal ID "01*aa*" of the information processing apparatus 20*aa* requesting login, and extracts a terminal ID of another request source terminal for which the terminal ID "01*aa*" of the information processing apparatus 20*aa* is registered as a destination terminal candidate (step S29). In the destination list management table 504*t* shown in FIG. 10, extracted terminal IDs of the other request source terminals are "01*ab*", "01*ba*" and "01*db*".

Next, the terminal state obtaining unit 55 of the transmission management system 50 searches the terminal management table 503*t* by using as a search key a terminal ID "01*aa*" of the information processing apparatus 20*aa* requesting login, and obtains the operational state of the information processing apparatus 20*aa* (step S30).

Next, the transmitting and receiving unit 51 transmits destination state information including a terminal ID "01*aa*" and an operational state "ONLINE" of the information processing apparatus 20*aa* obtained in step S30 to the request source terminals (the transmission terminals 10*ba* and 10*db*) whose operational states in the terminal management table 503*t* are "ONLINE" of the request source terminals of the terminal IDs ("01*ab*", "01*ba*", and "01*db*") extracted in step S29 (steps S31-1, S31-2). It should be noted that when the transmitting and receiving unit 51 transmits the destination state information to the request source terminals (transmission terminals 10*ba* and 10*db*), the transmitting and receiving unit 51 refers to IP addresses of the terminals stored in the terminal management table 503*t* (FIG. 9) based on the terminal IDs ("01*ba*" and "01*db*"). With the above operation, the terminal ID "01*aa*" and the operational state "ONLINE" of the information processing apparatus 20*aa* requesting login can be transmitted to other destination terminals (the transmission terminals 10*db* and 10*ba*) that can communicate with the information processing apparatus 20*aa* as a destination.

It should be noted that in another transmission terminal 10, when a user turns ON a power supply switch 109 (step S21), a power ON operation is accepted by the operation input accepting unit 12, and processes similar to steps S22 through S31-1, 31-2 are performed, whose description will be omitted.

Next, referring to FIG. 22, a process for establishing a session between an information processing apparatus 20 and another information processing apparatus 20 or a transmission terminal 10 will be described. In an embodiment, the information processing apparatus 20*aa* can communicate with at least one of the transmission terminals 10*ba* and 10*db*, which is a transmission terminal 10 as a destination candidate and whose operational state is "ONLINE". In the following description, it is assumed that the user of the information processing apparatus 20*aa* chooses to start communications with the transmission terminal 10*db* as a destination terminal.

First, when the user presses the operation button 108 to select the transmission terminal 10*db*, the operation input accepting unit 12 of the information processing apparatus 20*aa* receives an input selecting the transmission terminal 10*db* as a destination (step S41). Next, the transmitting and receiving unit 11 of the information processing apparatus 20 transmits start request information indicating a communication start request and including a terminal ID "01*aa*" of the information processing apparatus 20*aa* as a request source terminal and a terminal ID "01*db*" of the transmission terminal 10*db* as a destination terminal (step S42). With the above operation, the transmitting and receiving unit 51 of the transmission management system 50 receives the start request information and an IP address "1. 2. 1. 3" of the information processing apparatus 20*aa* as a request source terminal. Further, based on an terminal ID "01*aa*" of the information processing apparatus 20*aa* as a request source terminal and a terminal ID "01*db*" of the transmission terminal 10*db* as a destination terminal included in the start request information, the state management unit 53 changes the fields of operational states of records including the terminal ID "01*aa*" and the terminal ID "01*db*" in the terminal management table 503*t* of the terminal management DB 5003 into "COMMUNICATING" (step S43). In a state described above, the information processing apparatus 20*aa* and the transmission terminal 10*db* have not started a communication (call) yet, but are already in a communicating state. If another transmission terminal 10 tries to communicate with the information processing apparatus 20*aa* or the transmission terminal 10*db*, an audio message or a display message is output indicating that the information processing apparatus 20*aa* or the transmission terminal 10*db* is in a communicating state.

The transmission management system 50 generates a selection session ID used for selecting a relay apparatus 30 (step S44). Further, the session management unit 57 associates the selection session ID "se1" generated in step S44 with a terminal ID "01*aa*" of the information processing apparatus 20*aa* as a request source terminal and a terminal ID "01*db*" of the transmission terminal 10*db* as a destination terminal, and stores them in the session management table 505*t* of the storage unit 5000 (step S45).

After this, the transmission management system 50 narrows down a final (actual) relay apparatus 30 for relaying communications between the information processing apparatus 20*aa* and the transmission terminal 10*db* based on the relay apparatus management DB 5001 and the terminal management DB 5003, the details of which are omitted.

Next, the session management unit 57 of the transmission management system 50 stores a relay apparatus ID "111*a*" of the relay apparatus 30*a* selected as the final (actual) relay apparatus 30 in a field of the relay apparatus ID of a record of the session management table 505*t* of the session management DB 5005 in which record the selection session ID "se1" is included (step S67-1). The transmitting and receiving unit 51 transmits the relay apparatus ID "111*a*" and the IP address "1. 3. 2. 4" of the transmission terminal 10*db* to the information processing apparatus 20*aa* (step S67-21). It should be noted that the transmitting and receiving unit 51 of the transmission management system 50 transmits relay start request information indicating a relay start to the relay apparatus 30*a* via the communication network 2 (not shown). In the relay start request information, IP addresses ("1. 2. 1. 3", "1. 3. 2. 4") of the information processing apparatus 20*aa* and the transmission terminal 10*db* that are relayed are included. With the above operation, the relay apparatus 30*a* establishes a session for communicating image data and audio data with three resolutions (low resolution, medium resolution and high resolution) between the information processing apparatus 20*aa* and the transmission terminal 10*db* (step S69). As a result, the information processing apparatus 20*aa* and the transmission terminal 10*db* can start a video conference. It should be noted that image data with three resolutions is just an example. The number of resolutions may be greater or less than 3.

It should be noted that the transmission terminals 10 transmit and receive image data by using a video coding standard including H. 264 (H. 264/AVC, MPEG-4 part 10, MPEG4 AVC), expanded standard H. 264/SVC, MPEG-2, or the like.

Next, referring to FIG. 23, a process will be described in which, after the relay apparatus 30 is selected, display data representing an image displayed on the display device 120 of the information processing apparatus 20 is transmitted to the other information processing apparatus 20 or the other transmission terminal 10 and displayed on the display device 120 of the other information processing apparatus 20 or the other transmission terminal 10. Here, an example will be described in which information displayed by the information processing apparatus 20*aa* is displayed by the transmission terminal 10*db* as a destination terminal.

When the relay apparatus 30 is selected, the relay apparatus ID "111*a*" and an IP address "1. 3. 2. 4" of the transmission terminal 10*db* transmitted by the transmission management system 50 in step S67-21 are received by the transmitting and receiving unit 11 of the information processing apparatus 20*aa*. Further, the received relay apparatus ID "111*a*" and the IP address "1. 3. 2. 4" are stored in the storage unit 1000 by the storing and reading processing unit (step S67-22).

Next, the storing and reading processing unit 19 of the information processing apparatus 20*aa* reads the relay apparatus ID "111*a*" and the IP address "1. 3. 2. 4" of the destination transmission terminal 10*db* stored in the storage unit 1000 (step S77).

The display data obtaining unit 14*c* obtains display data of a screen displayed on the display device 120 (step S77-2). A process of step S77-2 will be described later.

Further, the transmitting and receiving unit 11 transmits resolution-converted display data and the IP address "1. 3. 2. 4" of the destination transmission terminal 10*db* to a relay apparatus 30 indicated by the relay apparatus ID "111*a*" read in step S77 (step S78).

When the relay apparatus 30 receives the display data transmitted by the information processing apparatus 20*aa* in step S78, image quality of the display data is changed based on the IP address "1. 3. 2. 4" of the destination transmission terminal 10*db* (step S79).

The relay apparatus 30 transmits the display data to the transmission terminal 10*db* (step S80).

When the transmitting and receiving unit 11 of the transmission terminal 10*db* receives the display data transmitted by the relay apparatus 30, the image display control unit 14*b* displays an image represented by the received display data on the display device 120*db* (step S81).

FIG. 24 is a flowchart of an example of a procedure for obtaining display data in step S77-2 in FIG. 23. The procedure shown in FIG. 24 starts after the end of step S77 in FIG. 23.

First, the operation input accepting unit 12 determines whether display data sharing is started by a user (S10). The start of the display data sharing is detected when the sharing button 533 is pressed to select a window.

In the case where the operation input accepting unit 12 accepts the start of the display data sharing (YES in S10), the transparent display control unit 18 stores a current display state (S20). The display state is either a transparent display ON state or a transparent display OFF state. By storing the display state, the display state can be returned to the original display state after the display data sharing is ended.

The transparent display control unit 18 refers to the stored display state, and if the transparent display is ON, then turns it OFF (S30). In other words, if the transparent display is ON, the display state is temporarily switched to a non-transparent display state. The switching method can be realized by, for example, having an application program interface (API) of desktop window manager (DWM) used by the transparent display control unit 18 in the case where the OS is Windows (registered trademark). The transparent display state can be switched from OFF to ON in a similar way.

It should be noted that Windows (registered trademark) is used as the OS in an embodiment. The transparent display state can also be switched from ON to OFF when the OS is Mac OS (registered trademark). Further, the load is increased by the transparent display in a similar way in iOS (registered trademark) or in Android (registered trademark). The transparent display state can be switched from ON to OFF in these OSs.

The display load for displaying a screen is higher in the transparent display state (an example of claimed display state with a high load) than in the non-transparent display state (an example of claimed display state with a low load). Therefore, if the audio data and the image data are obtained and the display data sharing is started while the transparent display state is maintained by the information processing apparatus 20, then there may be a case in which an OS's process for displaying a screen on the display device 120 has a delay and the screen may flicker. In the embodiment 1, the screen display processing load can be reduced by turning OFF the transparent display state during the display data sharing, and the decreased screen image quality such as a flickering screen can be avoided.

Next, the display data obtaining unit 14*c* obtains the display data of the selected window selected by the user (S40).

Next, the operation input accepting unit 12 determines whether display data sharing is ended by a user (S50). The operation input accepting unit 12 determines whether "END SHARING" is selected from a list displayed when the sharing button 533 is pressed. In the case where "END SHARING" is not selected (NO in S50), the process proceeds to step S78 in FIG. 23 and the display data is transmitted. Afterwards, the process returns to step S40.

In the case where "END SHARING" is selected (YES in S50), the transparent display control unit 18 refers to the stored display state and the display state is returned to the stored display state (S60).

It should be noted that the display state may not be returned to the original state, and the transparent display OFF state may be maintained after the display data sharing is ended. The flickering screen can be avoided when the transparent display OFF state is maintained.

It should be noted that in the case where the transparent display state is switched OFF in step S30, the user may feel something is wrong because the display state changes from the transparent display state to the non-transparent display state. Therefore, it may be preferable that in the case where the transparent display state is switched OFF, it be reported that the transparent display state is switched OFF.

Figure 25:
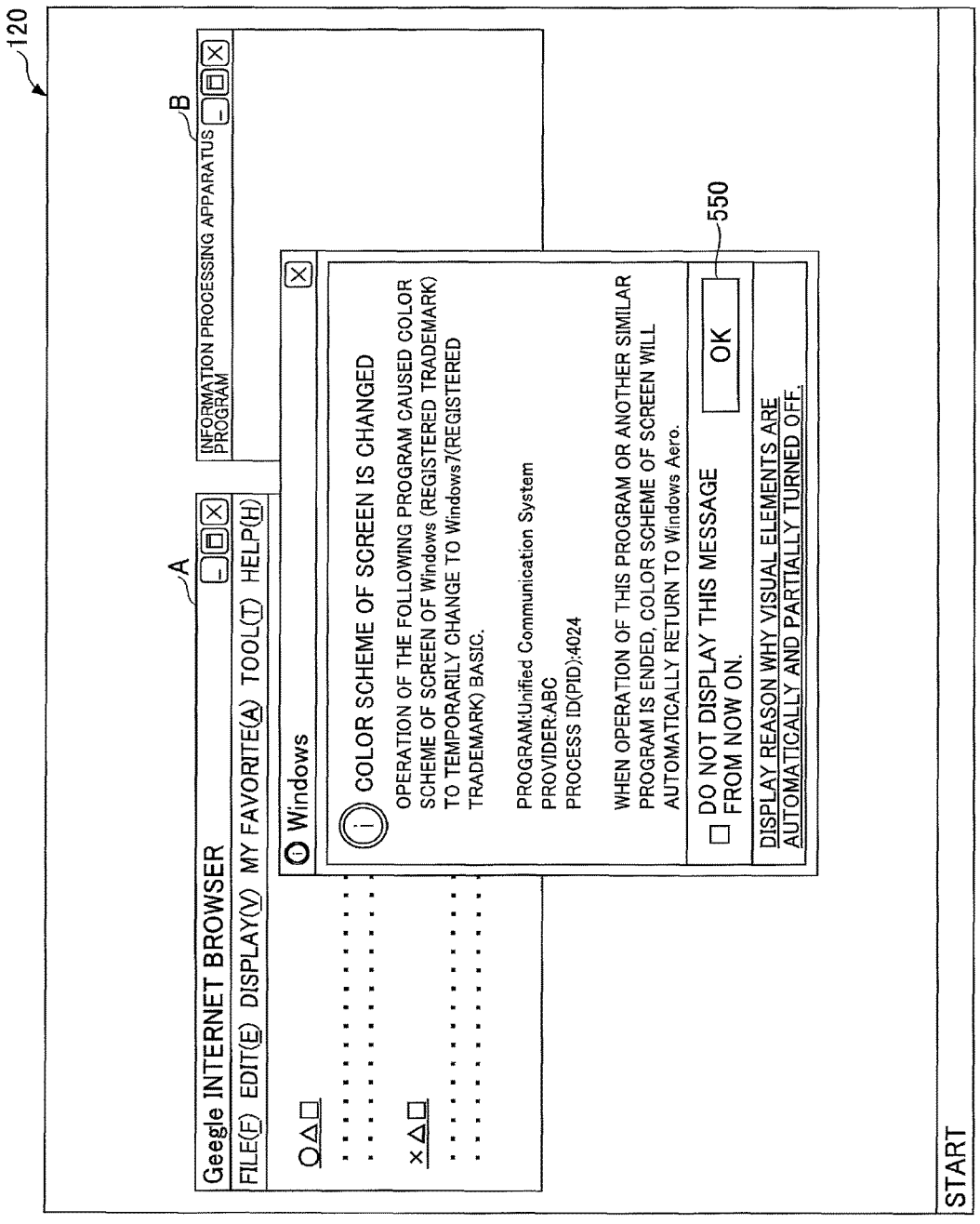
FIG. 25 is a drawing illustrating an example of a message which is displayed when transparent display is switched OFF in step S30.

FIG. 25 is a drawing illustrating an example of a message which is displayed when transparent display is switched OFF in step S30. The transparent display control unit 18 displays a predefined message when the transparent display is switched OFF. It should be noted that the message may be displayed before or after the transparent display is switched OFF.

In FIG. 25, a message "Color scheme of screen is changed. Operations of the following program caused the color scheme of screen of Windows (registered trademark) to temporarily change to Windows (registered trademark) basic." is displayed.

The user can use the information processing apparatus 20 almost without feeling something is wrong because the user understands why the transparent display state is changed. The message disappears when the user presses an OK button 550.

Figure 26:
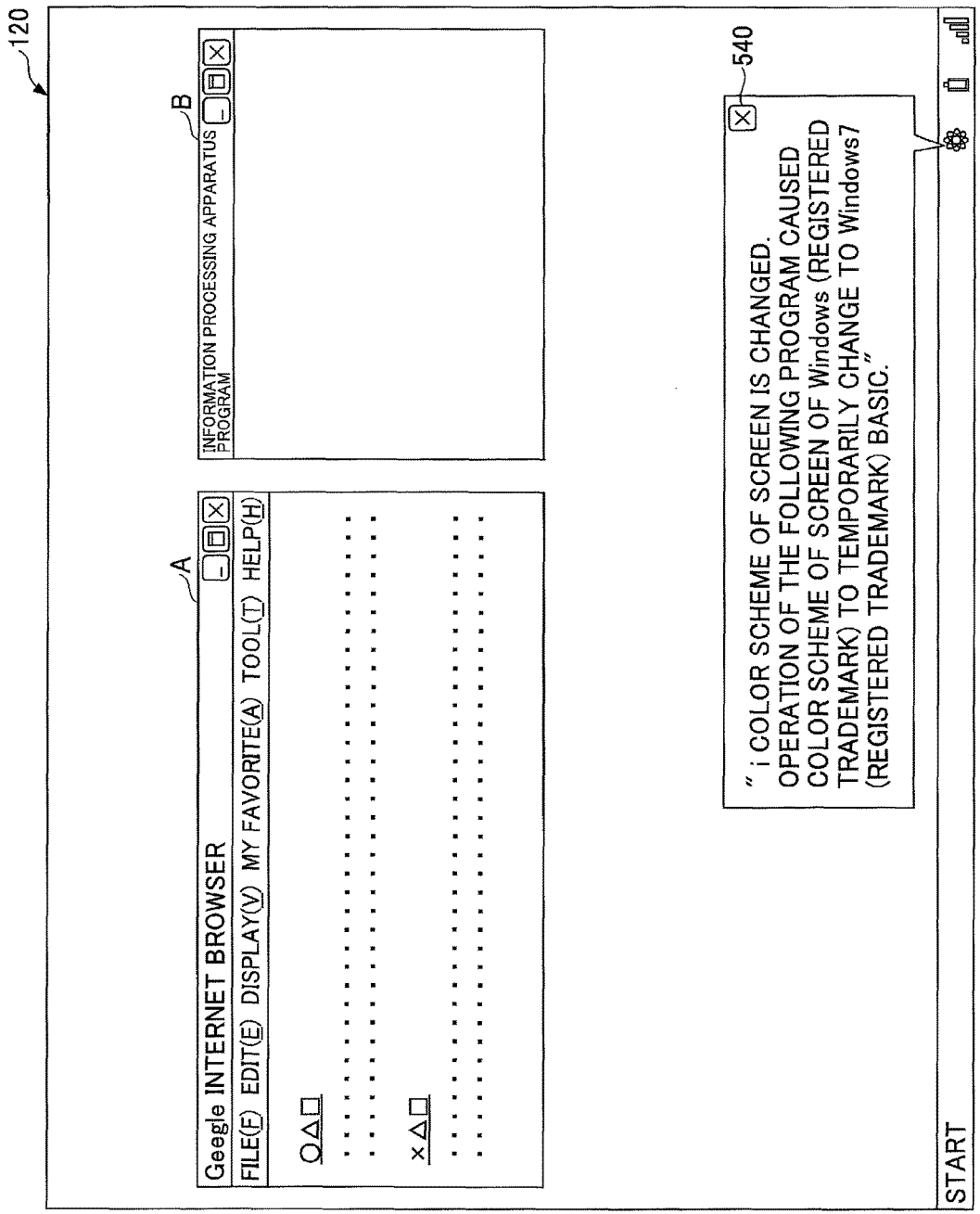
FIG. 26 is a drawing illustrating another example of a message which is displayed when transparent display state is switched OFF.

Further, as shown in FIG. 26, the message may be displayed as a balloon display in the task bar. FIG. 26 is a drawing illustrating another example of a message which is displayed when transparent display is switched OFF. In FIG. 26, the message is displayed as a balloon display when transparent display is switched OFF. The message displayed as a balloon display may disappear when the user selects a closing button 540, or the message may disappear without user operation when predetermined time elapses, which improves the operability.

As described above, an information processing apparatus 20 according to the embodiment 1 can reduce occurrence of a flickering screen by switching OFF the transparent display in a state where the load is increased as a result of sharing display data in addition to transmitting and receiving image data and audio data. Further, it is not necessary for a user to turn ON the transparent display because the transparent display is returned to ON without user operation, which improves the operability. Further, a message is displayed when the transparent display is switched OFF, which reduces the user's feeling that something is wrong.

Embodiment 2

In the embodiment 1, the information processing apparatus 20 switches OFF the transparent display in the case where the display data is shared, without distinguishing between an application window and a desktop window.

It should be noted, however, that the desktop window is not moved by user operation while the application window can be moved to any position by user operation. Therefore, the OS monitors a rewrite timing of the application window. As a result, the load for generating the display data is greater in the case where the display data of the application window is generated than in the case where the display data of the desktop window is generated.

Therefore, in the case where the display data of the desktop window (an example of claimed image data of an image of a full screen of a display apparatus) is shared, there may be a case where it is not necessary to switch OFF the transparent display. The user can see a window behind or operate a good design screen by maintaining the transparent display ON.

Therefore, an information processing apparatus 20 according to an embodiment 2 will be described, which apparatus 20 switches OFF the transparent display only in the case where the display data of an application window is shared.

It should be noted that the same elements in the embodiment 2 as the embodiment 1 perform the same functions as the embodiment 1. Therefore, only the main elements in the embodiment 2 may be described.

Figure 27:
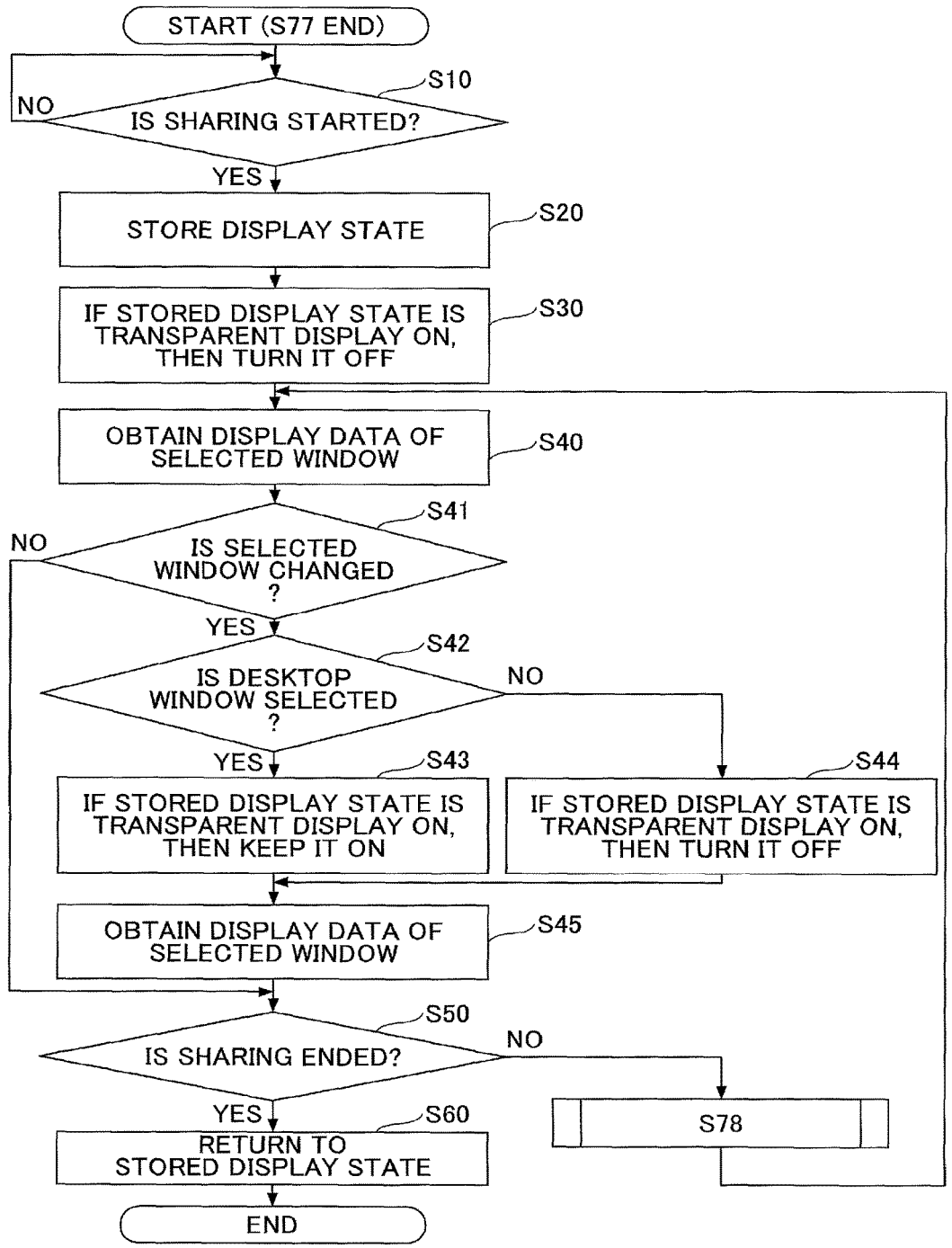
FIG. 27 is a flowchart of an example of a procedure for obtaining display data (Example 2).

FIG. 27 is a flowchart of an example of a procedure for obtaining display data in step S77-2 in FIG. 23. Steps S10 through S40 are the same as the embodiment 1.

When display data of a selected window is obtained in step S40, the operation input accepting unit 12 determines whether the selected window is changed (S41). In other words, the operation input accepting unit 12 determines whether another window different from the current data sharing window is selected from a list of windows (except for "END SHARING") displayed as a result of pressing the sharing button 533.

In the case where the selected window is not changed (NO in S41), the process proceeds to step S50 and the remaining process will be the same as in FIG. 24.

In the case where the selected window is changed (YES in S41), the transparent display control unit 18 determines whether the selected window is changed to the desktop window (S42).

In the case where the desktop window is selected (YES in S42), the processing load of generating display data is less than the case where the application window is selected. Therefore, the transparent display control unit 18 refers to the stored display state and, even when the transparent display is ON, keeps the transparent display ON (S43).

In the case where the desktop window is not selected (NO in S42), the processing load of generating display data is greater than the case where the desktop window is selected. Therefore, the transparent display control unit 18 refers to the stored display state and, when the transparent display is ON, switches OFF the transparent display (S44).

Next, the process proceeds to step S45, and the display data obtaining unit 14c obtains display data of the changed selected window (S45).

The remaining process will be the same as the embodiment 1. In other words, the operation input accepting unit 12 determines whether the display data sharing is ended by a user (S50). The operation input accepting unit 12 accepts a sharing end operation when "END SHARING" is selected from a list which will be described later. In the case where an operation of selecting "END SHARING" is not detected (NO in S50), the process proceeds to step S78 in FIG. 23 and the display data is transmitted. Afterwards, the process returns to step S40.

In the case where an operation of selecting "END SHARING" is detected (YES in S50), the transparent display control unit 18 refers to the stored display state and the display state is returned to the stored display state (S60).

With the above operation, similar to the embodiment 1, the flickering screen can be reduced. Further, in the case where the display state is the transparent display state, the display state is switched to the non-transparent display state only when the selected window is not the desktop window, and thus, compared with the embodiment 1, it is less likely that the user feels something is wrong due to the change of display state.

Embodiment 3

There is a case where an application window is moved out of the desktop area when the application window is moved by a user. In this case, for example, it is necessary for the OS to perform a further process for specifying the display area of the application window, and thus, the display processing load is greater than the case where the application window is displayed within the desktop area. As a result, the load for generating the display data is greater in the case where the display data of the application window is generated, a part of the application window being out of the desktop window, than in the case where the display data of the application window is generated, the application window being within the desktop window, or the display data of the desktop window is generated.

Therefore, in the case where the application window is not out of the desktop area, it may not be necessary to switch OFF the transparent display. The user can see a window behind or operate a good design screen by maintaining the transparent display ON.

Therefore, an information processing apparatus 20 according to an embodiment 3 will be described, which apparatus 20 switches OFF the transparent display only in the case where the display data of an application window is obtained, a part of the application window being out of the desktop area.

It should be noted that the same elements in the embodiment 3 as the embodiment 1 perform the same functions as the embodiment 1. Therefore, only the main elements in the embodiment 3 may be described.

Figure 28:
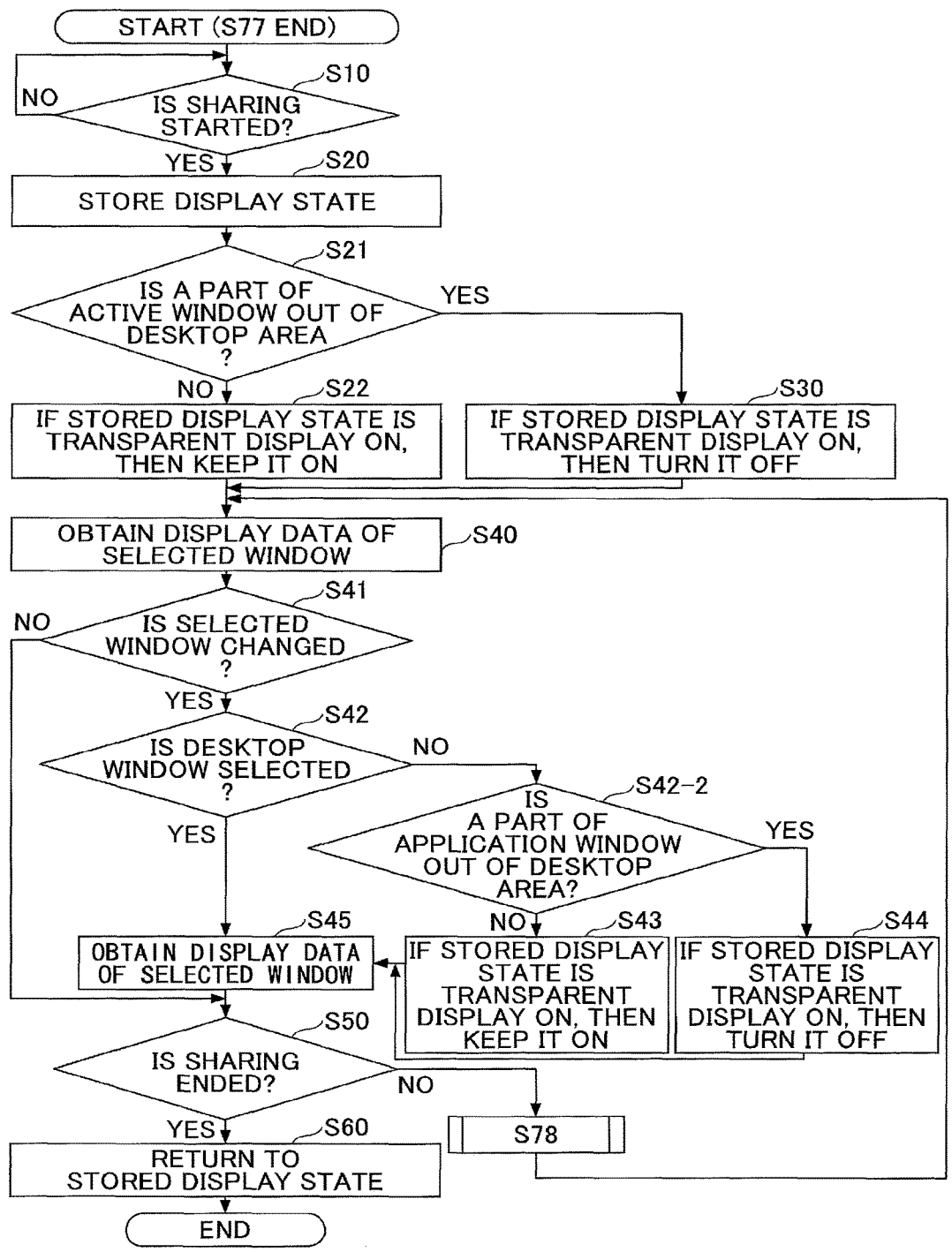
FIG. 28 is a flowchart of an example of a procedure for obtaining display data (Example 3).

FIG. 28 is a flowchart of an example of a procedure for obtaining display data in step S77-2 in FIG. 23. Steps S10 through S40 are the same as the embodiment 1.

After storing the display state in step S20, the transparent display control unit 18 determines whether a part of the selected window is out of the desktop area 9d (FIG. 29) (S21). For example, it is determined that a part of the selected window is out of the desktop area 9d when the following condition is met, and it is determined that a part of the selected window is within the desktop area 9d in the case where the condition is not met.

Figure 29:
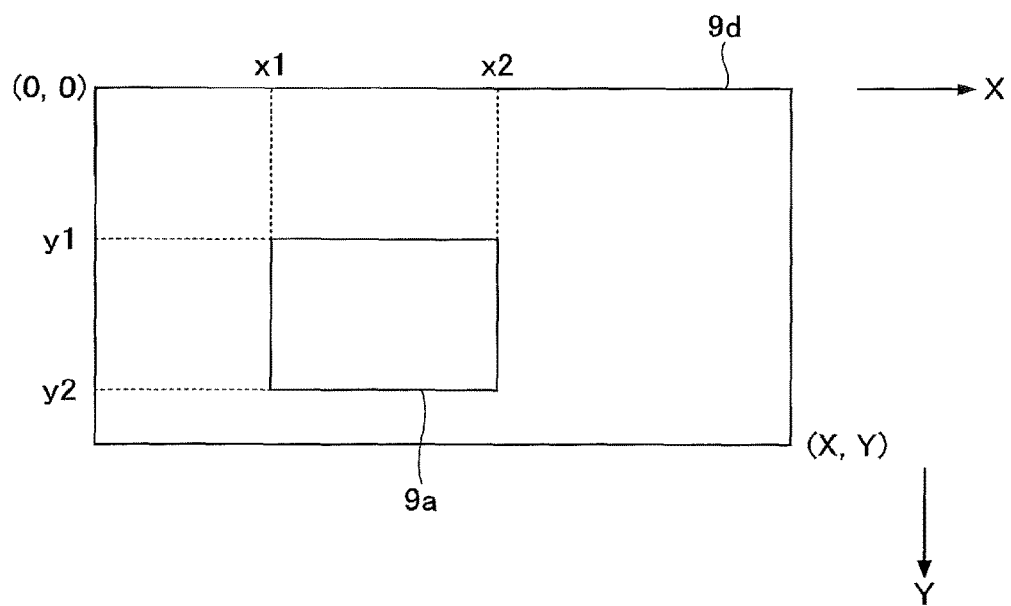
FIG. 29 is a drawing of an example illustrating a coordinate system used for determining whether an application window is out of the desktop area.

FIG. 29 is a drawing of an example illustrating a coordinate system used for determining whether a part of the application window is out of the desktop area 9d. The origin (0, 0) is set at the top left corner. (X, Y) is a coordinate set of the bottom right corner of the desktop area 9d. (x1, y1) is a coordinate set of the top left corner of the application window 9a. (x2, y2) is a coordinate set of the bottom right corner of the application window 9a.

As a result, the condition that a part of the application window 9a is out of the desktop area 9d will be as follows.

x1<0 or y1<0 or x2>X or y2>Y

Returning to FIG. 28, in the case where a part of the selected application window 9a is not out of the desktop area 9d (NO in S21), it is determined that the processing load of generating the display data is not high, and the transparent display control unit 18 refers to the stored display state, and, when the transparent display is ON, maintain the transparent display ON (S22).

In the case where a part of the selected application window 9a is out of the desktop area 9d (YES in S21), it is determined that the processing load of generating the display data is high, and the transparent display control unit 18 refers to the stored display state, and, when the transparent display is ON, temporarily switches OFF the transparent display (S30).

Next, the display data obtaining unit 14c obtains the display data of the selected window (S40). Further, the operation input accepting unit 12 determines whether the selected window is changed (S41). In the case where the selected window is not changed (NO in S41), the process proceeds to step S50 and the remaining process will be the same as in FIG. 24.

In the case where the selected window is changed (YES in S41), the transparent display control unit 18 determines whether the desktop window is selected as the selected window (S42). In the case where the desktop window is selected (YES in S42), it is determined that the processing load of generating display data is not high, and the display data obtaining unit 14c obtains the display data of the changed selected window (S45).

In the case where the desktop window is not selected (NO in S42), the transparent display control unit 18 determines whether a part of the selected window is out of the desktop area 9d (S42-2). Therefore, similar to step S21, in the case where a part of the selected application window 9a is not out of the desktop area 9d (NO in S42-2), it is determined that the processing load of generating the display data is not high, and the transparent display control unit 18 refers to the stored display state, and, when the transparent display is ON, maintain the transparent display ON (S43).

In the case where a part of the selected application window 9a is out of the desktop area 9d (YES in S42-2), it is determined that the processing load of generating the display data is high, and the transparent display control unit 18 refers to the stored display state, and, when the transparent display is ON, temporarily switches OFF the transparent display (S44).

Afterwards, the process proceeds to step S45, and the display data obtaining unit 14c obtains display data of the changed selected window (S45).

The remaining process will be the same as the embodiment 1. In other words, the operation input accepting unit 12 determines whether display data sharing is ended by a user (S50). The operation input accepting unit 12 accepts a sharing end operation when "END SHARING" is selected from a list.

In the case where an operation of selecting "END SHARING" is not detected (NO in S50), the process proceeds to step S78 in FIG. 23 and the display data is transmitted. Afterwards, the process returns to step S40.

In the case where an operation of selecting "END SHARING" is detected (YES in S50), the transparent display control unit 18 refers to the stored display state and the display state is returned to the stored display state (S60).

According to an information processing apparatus 20 according to the embodiment 3, it is further less often than the embodiment 2 to switch OFF the transparent display, and thus, compared with the embodiment 2, it is further less likely that the user feels something is wrong due to the change of display state. For example, when performance of the information processing apparatus 20 is relatively high, the information processing apparatus program 119 according to the embodiment 3 will be effective.

The information processing apparatus 20 may obtain a model number of the CPU and a memory capacity, and determine which process of the embodiments 1 through 3 should be employed. With the above operation, the necessity of switching OFF the transparent display can be minimized according to the performance of the information processing apparatus 20.

Embodiment 4

In the embodiments 1 through 3, the flickering screen of the display device 120 is suppressed by switching the transparent display from ON to OFF in the case where the display data is shared.

However, because the flickering screen occurs due to heavy load of a display process, there is another method for suppressing the flickering screen other than the method of switching OFF the transparent display. The other method includes reducing the load of creating the display data from a window.

In the case where a mouse cursor is combined with the display data, in order to make the mouse cursor appear to be moving smoothly, the instruction information obtaining unit 141 obtains the coordinate of the mouse cursor and obtains the icon image 17g more often than a predetermined frequency (e.g., one or more times per second), and the display data creating unit 142 combines the icon image 17g with the display data more often than a predetermined frequency.

Further, a process of obtaining the coordinates of the mouse cursor, obtaining the icon image 17g, and combining them is performed separately from a process of obtaining the display data.

As a result, the load of a process of obtaining the display data and combining the mouse cursor with the display data (that is, the load of a series of an obtaining process and a combining process) is high.

Therefore, an information processing apparatus 20 will be described in which the flickering screen can be suppressed without switching OFF the transparent display in the case where the transparent display is ON, by reducing the frequency of obtaining the display data or by not combining the mouse cursor with the display data.

Figure 30:
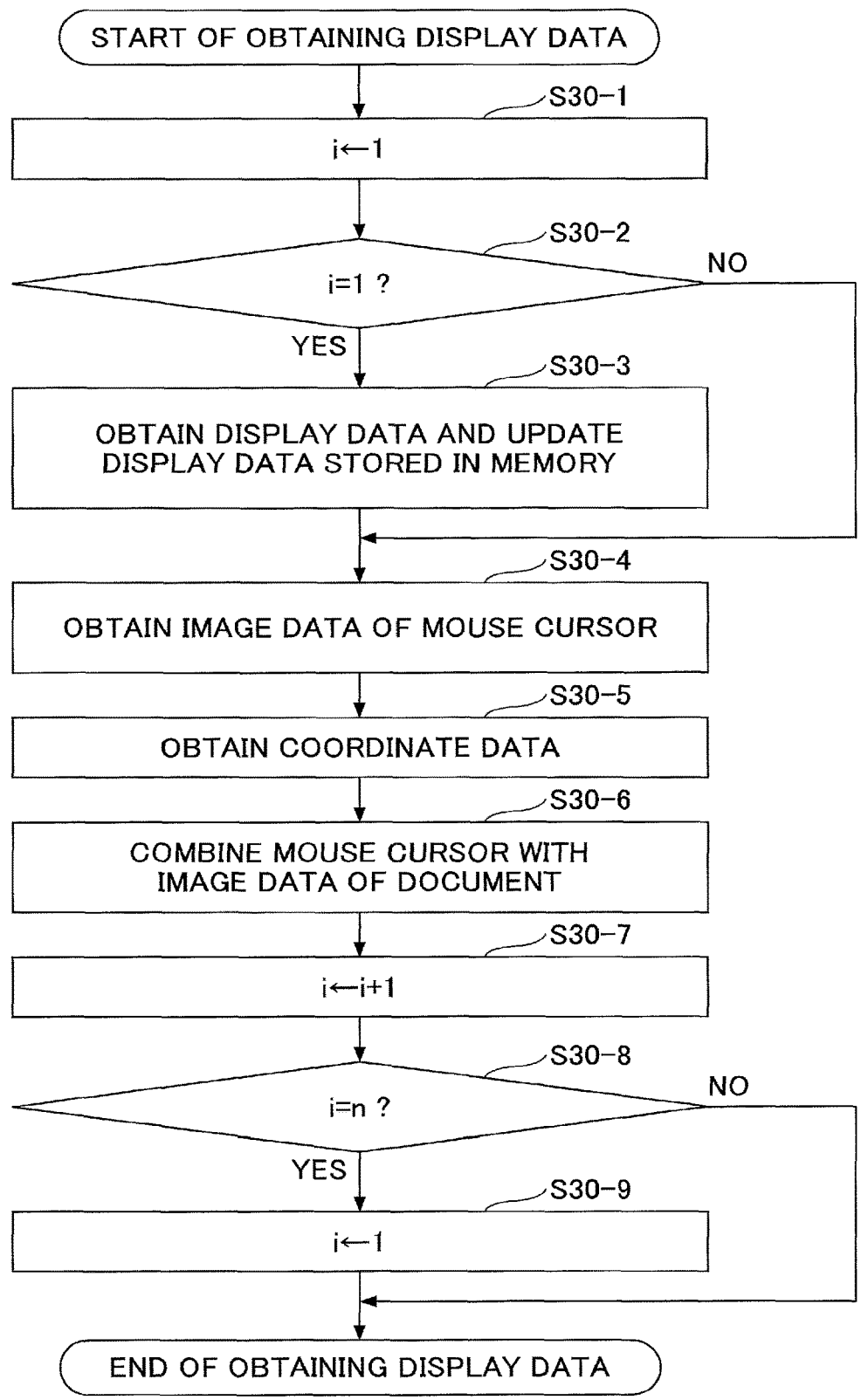
FIG. 30 is a flowchart of an example of a process which replaces a process of "switching OFF the transparent display if the transparent display of the stored display status is ON" in step S30 of FIG. 24.

FIG. 30 is a flowchart of an example of a process which can replace a process of "switching OFF the transparent display if the stored transparent display of the display state is ON" in step S30 of FIG. 24. In other words, in the case where the stored transparent display of the display state is ON, the display data obtaining unit performs the process shown in FIG. 30.

In FIG. 30, the display data obtaining unit 14c determines whether the display data should be created by using a variable i. For example, the frequency at which the display data obtaining unit 14c obtains the display data is restricted in such a way that the display data obtaining unit 14c obtains the display data once in every n times the instruction information obtaining unit 141 obtains the instruction information. Here, n is, for example, a natural number of 2 or more. There are various methods to determine the value of n. For example, n may be determined by a specification of the information processing apparatus 20, or n may be determined by setting by a user.

First, when the operation input accepting unit 12 accepts from the sharing button 533 an operation of selecting a window, the display data obtaining unit 14c initializes the variable i by setting 1 (S30-1).

Next, the display data obtaining unit 14c determines whether i=1 (S30-2), and obtains the display data only in the case where i=1 (S30-3). The display data obtaining unit 14c updates the display data stored in the RAM 103 or in the flash memory 104. In the case where i≠1, the display data obtaining unit 14c does not obtain the display data, and thus, the load of obtaining the display data can be reduced.

Next, the instruction information obtaining unit 141 obtains the image data of the mouse cursor (S30-4). Next, the instruction information obtaining unit 141 obtains the coordinate data 17h of the mouse cursor (S30-5).

Next, the display data creating unit 142 combines the image data of the mouse cursor with the display data (S30-6). In other words, regardless whether the display data is updated, the image data of the mouse cursor is combined with the display data. As a result, the mouse cursor appears to be moving smoothly to the user.

When the display data obtaining unit 14c obtains the display data in which the mouse cursor is combined, the display data obtaining unit 14c increments the variable i by 1 (S30-7).

Next, the display data obtaining unit 14c determines whether i=n (S30-8). In the case where i=n (YES in S30-8), the display data obtaining unit 14c initializes the variable i by setting 1 (S30-9).

With the above operation, once in every n times the instruction information is obtained, the information processing apparatus 20 can obtain the display data and combine the image data of the mouse cursor with the display data.

It should be noted that the display data obtaining unit 14c may cause the instruction information obtaining unit 141 to stop obtaining the instruction information. In the case where the instruction information obtaining unit 141 does not obtain the instruction information, the image data of the mouse cursor is not combined with the display data, and thus, the obtaining process load can be reduced compared with only reducing the frequency of obtaining the display data. Further, if it is enough for suppressing the flickering screen, only combining the image data of the mouse cursor with the display data may be stopped without reducing the frequency of obtaining the display data.

In the case where the frequency of obtaining the display data is reduced, or in the case where the image data of the mouse cursor is not combined with the display data, similar to the case in the embodiments 1 through 3, it is preferable that the fact of such an operation be displayed on the display device 120. The user can understand the situation that the frequency of obtaining the display data is reduced and that it is not appropriate to transmit the display data of a moving image, and thus, the user can understand why the image data of the mouse cursor is not combined.

As described above, FIG. 30 is a drawing illustrating a process which can replace step S30 in FIG. 24 according to the embodiment 1. Similarly, the process illustrated in FIG. 30 can also replace steps S30 and S44 in FIG. 27 and steps S30 and S44 in FIG. 28.

Further, the embodiment 4 and the embodiments 1 through 3 may be switched according to the user selection. For example, the user may select between reducing the update frequency of the display data (and stopping combining the image data of the mouse cursor) and switching OFF the transparent display. The user can avoid the flickering screen by using the user's favorite method.

Further, in the embodiment 4, the update frequency of the display data is reduced. However, a number of colors may be reduced. The amount of captured display data of the selected window is affected by the number of colors in addition to the width and height of the selected window. The number of colors can be selected by, for example, selecting from 16 bits or 32 bits as a bit number of a pixel. The more the amount of the display data, the heavier the display process load.

Therefore, the flickering screen can be suppressed, without switching OFF the transparent display, by reducing the number of colors of the screens (of the desktop window and the application window). It should be noted that, similar to the case of the reduction of frequency of obtaining the display data, the user may select between the methods for suppressing the flickering screen.

As described above, the flickering screen can be suppressed in the case where the information processing apparatus 20, which replaces a dedicated terminal, transmits the image data, audio data, and the display data. It should be noted that the flickering screen may be suppressed by switching OFF the transparent display in the case where the information processing apparatus 20 obtains the display data as the external input apparatus 40.

As described above, a video conference system is used as an example of the transmission system 1 shown in FIG. 1. However, the transmission system 1 is not limited to a video conference system, but may be a telephone system such as an Internet Protocol (IP) telephone, an Internet telephone, etc.

Further, the communication system of a mobile telephone or a smartphone may be replaced by the transmission system 1. In this case, the information processing apparatus 20 or the transmission terminal 10 corresponds to a mobile telephone. The information processing apparatus 20 or the transmission terminal 10 as a mobile telephone includes a body of a mobile telephone, a display button, a display portion, a mike, and a speaker included in the body. It should be noted that the display portion is a touch panel.

In this case, the information processing apparatus 20 or the transmission terminal 10 is connected to the communication network 2 via a mobile telephone line (including wireless communication that mainly covers a relatively wide range such as outdoors by using aerial power from a base station), or the like.

Figure 31:
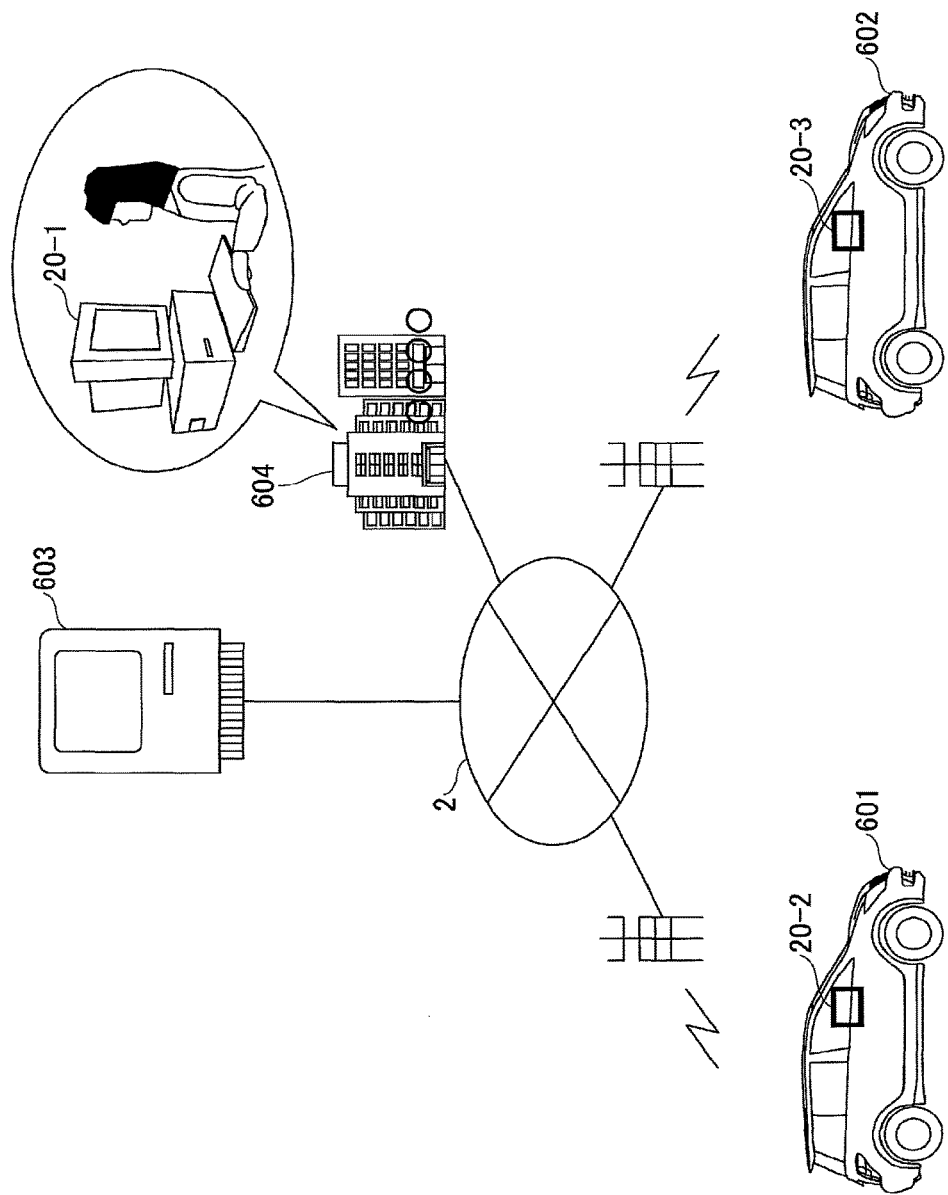
FIG. 31 is a drawing illustrating an example of a system structure diagram in the case where the information processing apparatus or the transmission terminal is used as a car-navigation apparatus.

Further, as shown in FIG. 31, the information processing apparatus 20 or the transmission terminal 10 may be used as a car-navigation apparatus. FIG. 31 is a drawing illustrating an example of a system structure diagram in the case where the information processing apparatus 20 or the transmission terminal 10 is used as a car-navigation apparatus. In this case, one of the information processing apparatus 20 and the transmission terminal 10 corresponds to a car-navigation apparatus 20-2 installed in a car 601. The other of the information processing apparatus and the transmission terminal 10 corresponds to a management terminal 20-1 used by a communicator of a management center 604, a management server 603 for controlling the car-navigation apparatus, or a car-navigation apparatus 20-3 installed in another car 602.

Figure 32:
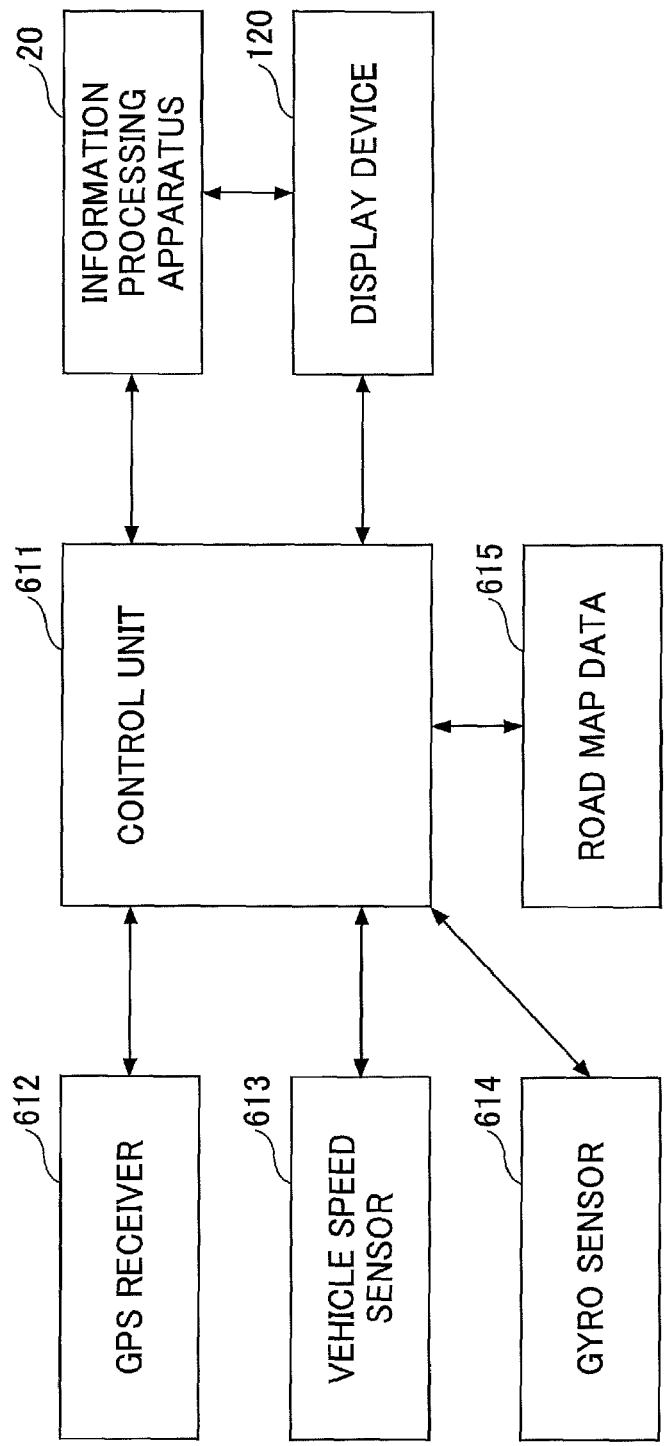
FIG. 32 is a structure diagram of an example of a car-navigation apparatus.

FIG. 32 is a structure diagram of an example of a car-navigation apparatus. The car-navigation apparatus includes a control unit 611 for controlling the entire apparatus, a GPS receiver 612, a vehicle speed sensor 613, a gyro sensor 614, road map data 615, etc. Further, an information processing apparatus 20 according to an embodiment is connected to the control unit 611. The control unit 611 includes a microcomputer, etc., executes a program, and provides functions as a car-navigation apparatus. The GPS receiver 612 captures GPS satellite signals and outputs a coordinate set of its current position. The vehicle speed sensor 613 detects speed of a vehicle (rotational speed of a wheel). The gyro sensor 614 detects angular velocity. A direction of travel of a vehicle can be calculated by integrating the angular velocity.

The road map data 615 is data in which a node and a link are combined to represent a road, which may be downloaded from outside or stored in the vehicle beforehand. The road map is displayed on the display device 120.

It should be noted that the car-navigation apparatus may also include an audio function for outputting music or TV broadcasting. Further, the car-navigation apparatus may include a browser function for displaying a Web site.

The control unit 611 estimates a position of the vehicle by applying an autonomous navigation method to positional information detected by the GPS receiver 612, in which method a travel distance calculated by the car speed sensor 613 is combined with the direction of travel detected by the gyro sensor 614. The position of the vehicle is displayed on the road map by using a vehicle mark or the like.

The car-navigation apparatus is connected to the communication network 2 via a mobile telephone line, etc., by using a function of the information processing apparatus 20 or a function of a mobile telephone.

The information processing apparatus 20 displays on the display device 120 a screen as shown in FIG. 15, and a user selects a destination terminal from a list of destination terminals displayed on the display device 120. After the login, image data of a camera and audio data can be transmitted and received. Further, with an operation by the user, the information processing apparatus 20 can obtain display data including the road map data and TV video data. In this case, the car-navigation apparatus can transmit the display data to a destination car-navigation apparatus.

Therefore, similar to the information processing apparatus 20 or the transmission terminal 10 installed in an office, the information processing apparatus 20 installed in a mobile body can also transmit and receive image data, audio data, and display data.

As described above, referring to the drawings, an embodiment of the present invention is described in detail. It should be noted that the above description is provided to help in understanding the present invention, and is not intended to limit the scope of the invention. Further, the embodiments are not exclusive to each other. Therefore, elements of different embodiments may be combined as long as no conflict arises. Various modifications and variations may be possible within the scope of the claimed invention.

DESCRIPTION OF THE REFERENCE NUMERALS 1 transmission system
2 communication network
10 (10ba, 10bb, 10da, 10db) transmission terminal
14a imaging unit
14b image display control unit
14c display data obtaining unit
18 transparent display control unit
(20aa, 20ab, 20ca, 20cb) information processing apparatus
(30a, . . . , 30d) relay apparatus
40 (40aa, . . . , 40db) external input apparatus
50 transmission management system
120, 216 display device
141 instruction information obtaining unit
142 display data creating unit

What is claimed is:

1. An information processing apparatus capable of communicating with another apparatus via a network, the information processing apparatus comprising:
  circuitry configured to
    display an image on a display apparatus included in or connected to the information processing apparatus;
    transmit image data of the image displayed on a screen of the display apparatus to the another apparatus via the network; and
    reduce a processing load involved in displaying the image on the display apparatus when the circuitry transmits the image data to the another apparatus, wherein
  the circuitry displays the image on the display apparatus in a transparent display state in which the image is displayed transparently in a display area located in the screen of the display apparatus such that an overlapped portion of a first window of the image over which a second window of the image overlaps is visible, or in a non-transparent display state in which the image is displayed non-transparently in the display area such that the overlapped portion of the first window over which the second window overlaps is not visible, and
  the circuitry switches the display state of the image displayed in the display area from the transparent display state to the non-transparent display state when the circuitry transmits the image data to the another apparatus.

2. The information processing apparatus according to claim 1, wherein
  a second load involved in the non-transparent display state being less than a first load involved in the transparent display state.

3. The information processing apparatus according to claim 1, wherein the circuitry is further configured to set whether first image data of a first image displayed on an entire screen of the display apparatus is obtained, or second image data of a second image of the display area is obtained,
  the circuitry does not reduce the processing load involved in displaying the image on the display apparatus when the circuitry sets that the first image data of the first image displayed on an entire screen of the display apparatus is obtained, and
  the circuitry reduces the processing load involved in displaying the image on the display apparatus in the case where the circuitry sets that the second image data of the second image of the display area is obtained.

4. The information processing apparatus according to claim 1, wherein
  the circuitry reduces the processing load involved in displaying the image on the display apparatus when a part of display contents exists out of a screen area of the display apparatus.

5. The information processing apparatus according to claim 1, wherein
  the circuitry displays on the display apparatus information indicating that the processing load is reduced when the circuitry reduces the processing load involved in displaying the image on the display apparatus.

6. The information processing apparatus according to claim 1, wherein the circuitry is further configured to obtain the image data of the image displayed on the display apparatus, and
  the circuitry reduces the processing load involved in obtaining the image data of the image displayed on the display apparatus when the circuitry transmits the image data to the another apparatus.

7. The information processing apparatus according to claim 6, wherein
  the circuitry combines an image of a pointing device with the image data, and
  the circuitry obtains the image data less frequently when the circuitry transmits the image data to the another apparatus than when the circuitry does not transmit the image data.

8. The information processing apparatus according to claim 6, wherein
  the circuitry combines an image of a pointing device with the obtained image data when the circuitry does not transmit the image data to the another apparatus, and
  the circuitry does not combine the image of the pointing device with the obtained image data when the circuitry transmits the image data to the another apparatus.

9. An information processing system comprising:
  a plurality of information processing apparatuses capable of communicating with each other, wherein
  a first information processing apparatus of the plurality of information processing apparatuses includes circuitry configured to
    display an image on a first display apparatus included in or connected to the first information processing apparatus,
    transmit image data of the image displayed on a screen of the first display apparatus to a second information processing apparatus, and reduce a processing load involved in displaying the image on the first display apparatus when the circuitry transmits the image data to the second information processing apparatus, and wherein the second information processing apparatus includes circuitry configured to receive the image data, and display the image data on a second display apparatus, and the first information processing apparatus displays the image on the first display apparatus in one of a transparent display state and a non-transparent display state, the transparent display state being a state in which an image in a display area within a screen of the first display apparatus is displayed transparently such that an overlapped portion of a first window of the image over which a second window of the image overlaps is visible, and the non-transparent display state being a state in which the image in the display area is displayed non-transparently such that the overlapped portion of the first window over which the second window overlaps is not visible, and the first information processing apparatus switches the display state of the image displayed in the display area from the transparent display state to the non-transparent display state when the first information processing apparatus transmits the image data to the second information processing apparatus.

10. The information processing system according to claim 9, wherein the first information processing apparatus displays the image on the first display apparatus in one of a plurality of display states having different processing loads, and the first information processing apparatus switches the display state of the image displayed on the first display apparatus from a first display state to a second display state when the first information processing apparatus transmits the image data to the second information processing apparatus, a second load involved in the second display state being less than a first load involved in the first display state.

11. A method for an information processing apparatus capable of communicating with another apparatus via a network, the method comprising:

displaying an image on a display apparatus included in or connected to the information processing apparatus, transmitting image data of the image displayed on a screen of the display apparatus to the another apparatus via the network; and reducing a processing load involved in displaying the image on the display apparatus when the the image data is transmitted to the another apparatus, wherein the displaying displays the image on the display apparatus in one of a transparent display state and a non-transparent display state, the transparent display state being a state in which an image in a display area within a screen of the display apparatus is displayed transparently such that an overlapped portion of a first window of the image over which a second window of the image overlaps is visible, and the non-transparent display state being a state in which the image in the display area is displayed non-transparently such that the overlapped portion of the first window over which the second window overlaps is not visible, and the reducing switches the display state of the image displayed in the display area from the transparent display state to the non-transparent display state when the transmitting transmits the image data to the another apparatus.

12. The method according to claim 11, wherein a second load involved in the non-transparent display state being less than a first load involved in the transparent display state.

* * * * *